United States Patent
Suzuki et al.

(10) Patent No.: US 6,625,511 B1
(45) Date of Patent: Sep. 23, 2003

(54) EVALUATION METHOD AND ITS APPARATUS OF WORK SHOP AND PRODUCT QUALITY

(75) Inventors: Tatsuya Suzuki, Yokohama (JP); Toshijiro Ohashi, Chigasaki (JP); Seii Miyakawa, Yokohama (JP); Masaaki Asano, Naka (JP); Takashi Kubota, Kawasaki (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/526,561

(22) Filed: Mar. 16, 2000

(30) Foreign Application Priority Data

Sep. 27, 1999 (JP) .......................................... 11-273368

(51) Int. Cl.⁷ .............................................. G06F 19/00
(52) U.S. Cl. ...................................... 700/110; 702/185
(58) Field of Search ...................... 700/97, 103, 104, 700/108, 109–111, 117; 702/182, 183, 185; 703/13

(56) References Cited

U.S. PATENT DOCUMENTS

| | | | |
|---|---|---|---|
| 3,875,383 A | | 4/1975 | Somerville et al. ........... 700/34 |
| 3,876,872 A | | 4/1975 | Splitz ............................ 700/34 |
| 5,475,695 A | * | 12/1995 | Caywood et al. ............ 714/738 |
| 5,497,331 A | | 3/1996 | Iriki et al. .................... 700/121 |
| 5,544,256 A | | 8/1996 | Brecher et al. .............. 382/149 |
| 5,617,321 A | * | 4/1997 | Frizelle et al. .............. 700/104 |
| 5,761,093 A | * | 6/1998 | Urbish et al. ................ 700/107 |
| 5,773,315 A | | 6/1998 | Jarvis ........................... 438/14 |
| 5,787,021 A | | 7/1998 | Samaba ........................ 702/84 |
| 5,910,011 A | | 6/1999 | Cruse ............................ 438/16 |
| 5,946,214 A | | 8/1999 | Heavlin et al. .............. 700/121 |
| 5,971,586 A | | 10/1999 | Mori ........................... 700/108 |
| 6,065,133 A | * | 5/2000 | Draber ........................... 714/1 |
| 6,230,066 B1 | * | 5/2001 | Sferro et al. ................. 700/104 |
| 6,253,115 B1 | * | 6/2001 | Martin et al. ................. 700/97 |
| 6,353,804 B1 | * | 3/2002 | Bowman ..................... 702/181 |

FOREIGN PATENT DOCUMENTS

| | | |
|---|---|---|
| JP | 1167631 | 7/1989 |
| JP | 6196900 | 7/1994 |
| JP | 713617 | 1/1995 |
| JP | 7271587 | 10/1995 |
| JP | 962309 | 3/1997 |
| JP | 1033415 | 1/1998 |
| JP | 1079599 | 3/1998 |

OTHER PUBLICATIONS

Nikkagiren Reliability Engineering Series 7, "Application of FMEA & FTA". (English translation).

* cited by examiner

Primary Examiner—Leo Picard
Assistant Examiner—Paul Rodriguez
(74) Attorney, Agent, or Firm—Antonelli, Terry, Stout & Kraus, LLP

(57) ABSTRACT

Method and apparatus for evaluating quality of a product, and a recording medium therefor. The invention includes creating and storing in advance a workshop evaluating database, extracting from the prepared workshop evaluating database those failure occurrence ratio indexes which correspond to workshop facility levels of an input manufacturing workshop for workshop-conditioned failure influential items thereof, respectively, and evaluating/estimating failure occurrence likelihood for standard manufacturing works in the manufacturing workshop, the failure occurrence likelihood being then stored as workshop index in a product evaluating database, and evaluating/estimating a quality indicating a work-related defective ratio for the products to be manufactured through a plurality of manufacturing works in the manufacturing workshop by using the workshop indexes concerning that manufacturing workshop which has been stored in the article evaluating database in the workshop evaluating step.

21 Claims, 12 Drawing Sheets

FIG. 4

4b1: MANUFACTURING WORKSHOP EVALUATING DATABASE

| | | | | | |
|---|---|---|---|---|---|
| 60 | CATEGORY | | 1 | 2 | 4 |
| 61 | ITEM NUMBER | | 1 | 8 | 13 |
| 62 | WORKSHOP-CONDITIONED FAILURE INFLUENTIAL ITEM | | PERCENTAGE ATTENDANCE (S) | PERSON IN CHARGE OF MANAGING EQUIPMENT | ILLUMINATION (L) |
| 63 | LEVEL 1 (LEVEL IS HIGH) | | S≧97% | ALL DETERMINED | L≧1000lx |
| 63 | LEVEL 2 (MEDIUM) | | 97%>S≧90% | DETERMINED (FOR MORE THAN 90% INCLUSIVE OF ALL EQUIPMENT) | 1000lx>L≧600lx |
| 63 | LEVEL 3 (LOW) | | 90%>S | DETERMINED (FOR LESS THAN 90% OF ALL EQUIPMENT) | 600lx>L |
| 64 | INTER-ITEM WEIGHING COEFFICIENT | | 2 | 1 | 1 |
| 65 / 65a | DEFECTIVE OCCURRENCE RATE COEFFICIENTS | FAILURE INCURRENCE COEFFICIENT | 3 | 2 | 2 |
| 65b | | DEFECTIVE EXTRACTION RATIO COEFFICIENT | 1 | 2 | 2 |
| 65c | | FAILURE COPING-TIME COEFFICIENT | 2 | 1 | 0 |
| 66 ADVICE ON POINT OF MEASURE | FOR LEVEL 2 | SHORT-TERM MEASURES PLAN | ALLOCATE WORKER OF HIGH PERCENTAGE ATTENDANCE TO IMPORTANT PROCESS | DETERMINE PERSON IN CHARGE OF MANAGING ALL EQUIPMENT | USE LOCALIZED LIGHTING DEPENDING ON WORK |
| | FOR LEVEL 2 | LONG-TERM MEASURES PLAN | •PRACTISE EDUCATION FOR MULTI-FACULTY WORKER •SET UP GOAL AND RESPONSIBILITY | PRACTISE EDUCATION AND TRAINING CONCERNING OPERATION AND MAINTENANCE OF EQUIPMENT | CHECK ALL LIGHTING EQUIPMENT (TYPES OF FLUORESCENT LAMPS) |
| | FOR LEVEL 3 | SHORT-TERM MEASURES PLAN | SET CHECK PROCESS FOR IMPORTANT PROCESS | DETERMINE PERSONS IN CHARGE OF MANAGING ALL EQUIPMENT (WITH PRIORITY TO IMPORTANT EQUIPMENT) | USE LOCALIZED LIGHTING DEPENDING ON WORK |
| | FOR LEVEL 3 | LONG-TERM MEASURES PLAN | •SET UP CLEARLY GOAL (FOR INDIVIDUALS/GROUPS) •IMPART RESPONSIBILITY (TO INDIVIDUALS/GROUPS) | PRACTISE EDUCATION AND TRAINING CONCERNING OPERATION AND MAINTENACE OF EQUIPMENT | CHECK ALL LIGHTING EQUIPMENT (DISPOSITION, POSITION, NUMBER) |
| 67 COMMENTS | FOR LEVEL 2 | | PERCENTAGE ATTENDANCE IS SLIGHTLY LOW, PAY ATTENTION TO PROCESS ORGANIZATION | NO PERSON IS DETERMINED FOR MANAGING SOME EQUIPMENT, SOME PROBLEM IN RELIABILITY OF EQUIPMENT | ILLUMINATION IS LOW, USE LOCALIZED LIGHTING FOR PRECISION WORK |
| | FOR LEVEL 3 | | PROCESS ORGANIZATION IS INSTABLE BECAUSE OF LOW PERCENTAGE ATTENDANCE, DIFFICULT TO STABILIZE QUALITY | MANY EQUIPMENTS THAT PERSONS FOR MANAGING THEM ARE NOT DETERMINED. RELIABILITY OF EQUIPMENT IS CONCERNED | ILLUMINATION IS LOW, CHECK EARLY ALL ILLUMINATION FITTINGS |

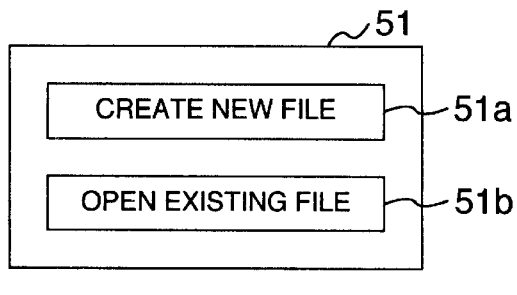
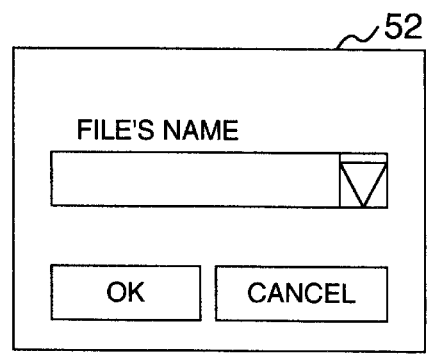

FIG. 10

| CATEGORY (60) | ITEM ID NUMBER (61) | INPUTTED WORKSHOP LEVEL (76) | RESULTS OF FAILURE OCCURRENCE RATIO COMPUTATION FOR EVALUATION-SUBJECTED WORKSHOPS (92) | | | | | IDEAL WORKSHOP FAILURE OCCURRENCE DEGREE (93a) | WORST WORKSHOP FAILURE OCCURRENCE DEGREE (93b) | INTRE-ITEM RELATIVE WEIGHING COEFFICIENT (64) | FAILURE OCCURRENCE RATIO COEFFICIENTS (65) | | |
|---|---|---|---|---|---|---|---|---|---|---|---|---|---|
| | | | FAILURE INCURRENCE DEGREE (92a) | DEFECTIVE EXTRCTION DEGREE (92b) | FAILURE COPING TIME DEGREE (92c) | FAILURE OCCURRENCE DEGREE (92d) | ROOM FOR IMPROVEMENT (92e) | | | | FAILURE INCURRENCE COEFFICIENT (65a) | DEFECTIVE EXTRACTION DEGREE COEFFICIENT (65b) | FAILURE COPING TIME COEFFICIENT (65c) |
| 1 | 1 | 2 | 12 | 4 | 8 | 24 | 12 | 12 | 36 | 2 | 3 | 1 | 2 |
| 2 | 8 | 1 | 2 | 2 | 1 | 5 | 0 | 5 | 15 | 1 | 2 | 2 | 1 |
| 4 | 13 | 3 | 6 | 6 | 0 | 12 | 8 | 4 | 12 | 1 | 2 | 2 | 0 |
| TOTAL | | | 57 | 42 | 25 | | | | | | | | |
| WORKSHOP-RELATED FRACTION DEFECTIVE (98) | | (99) 50ppm | | | | | | | | | | | |

```
┌─────────────────────────────────────────────────────────────────────┐
│ WORKSHOP EVALUATION  OUTPUT OF EVALUTION RESULT              [X]    │~80
│ NAME OF EVALUATION                                                  │
│ UNDERGOING      [MANUFACTURING WORKSHOP X]                          │~71
│ WORKSHOP                                                            │
```

- 99 — (1) WORKSHOP FRACTION DEFECTIVE  [50]  (ppm)
- 84 — (2) WORKSHOP DIAGNOSIS RESULT #1 (POINT-BY-POINT ADVICE FOR WORKSHOP IMPROVEMENT)

(EVALUATION CATEGORY)   (EVALUATION SCORE)   (COMMENT) — 87

- 85 — ① WORKER         86 — [70]   • INSUFFICIENCY OF EDUCATION / TRAINING
- ② EQUIPMENT                [50]   • RELIABILITY OF EQUIPMENT IS VERY CONCERNED

⑤ MANAGEMENT  [70]  • INSUFFICIENCY OF WORK STANDARDS ESTABLISHED ONLY FOR SOME PROCESSES

88 — (3) WORKSHOP DIAGNOSIS RESULT #2 (POINT-BY-POINT ADVICE FOR WORKSHOP IMPROVMENT)

| NO. | POINT FOR IMPROVEMENT (88a) | SHORT-TERM MEASURES PLAN (88b) | LONG-TERM MEASURES PLAN (88c) |
|---|---|---|---|
| 1 | WORK-RELATING INSTRUCTIONS / COMMANDS | • ESTABLISHING OF WORK STANDARDS FOR ALL PROCESSES AND THOROUGHGOING GUIDANCE BASED THEREON | • THOROUGHGOING MAINTENANCE OF WORK STANDARDS DOCUMENTS |

EVALUATION METHOD AND ITS APPARATUS OF WORK SHOP AND PRODUCT QUALITY

CROSS-REFERENCED TO RELATED APPLICATION

This application is related to application Ser. No. 09/048,988, filed Mar. 27, 1998, entitled FRACTION DEFECTIVE ESTIMATING METHOD, SYSTEM FOR CARRYING OUT THE SAME AND RECORDING MEDIUM, now U.S. Pat. No. 6,108,586; application Ser. No. 09/566,482, filed May 8, 2000, entitled FRACTION DEFECTIVE ESTIMATING METHOD, SYSTEM FOR CARRYING OUT THE SAME AND RECORDING MEDIUM; and application Ser. No. 09/566,481, now U.S. Pat. No. 6,401,000 filed May 8, 2000, entitled FRACTION DEFECTIVE ESTIMATING METHOD, SYSTEM FOR CARRYING OUT THE SAME AND RECORDING MEDIUM.

BACKGROUND OF THE INVENTION

The present invention relates to a method of estimating for evaluation a failure occurrence likelihood (real ability) of a manufacturing workshop upon manufacturing electric/electronic apparatuses for home use, products (or articles) for office-automation (OA) and the like by assembling or processing component parts therefor and an apparatus for carrying out the method, and additionally the invention concerns a product quality evaluation method for evaluating quality such as work-related fraction defective or work-related defective ratio and the like of products or articles such as those for home use, office automation (OA) and the like which are manufactured by assembling or processing component parts therefor and an apparatus for carrying out the method, and furthermore the invention concerns a recording medium storing therein a program or programs for executing the estimation/evaluation methods.

Most of the techniques known heretofore in this field are directed to estimation of causes for occurrence of failures or defects on the basis of phenomena which have actually taken place. As the hitherto known techniques for estimating the causes for the failures on the basis of the contents of phenomena actually taken place at the manufacturing stage, there can be mentioned the technique disclosed in JP-A-1-167631 (hereinafter referred to as the prior art 1) and JP-A-6-196900 (hereinafter referred to as the prior art 2). In the prior art 1, there is disclosed a work readjusting method according to which causes for failures or defects are defined in correspondence to combinations of passable/impassable items after inspection or examination of works, whereon degrees of correlation between the combinations of the passable/impassable items and the causes for failures or defects are estimated by taking into account remedying measures as taken, to thereby determine the cause for failure or defect on the basis of the degree of correlation between the combinations of passable/impassable items and the causes for failure or defect as estimated, whereon the cause for failure or defect as determined is removed by taking proper measures pertinent to the cause for failure or defect as determined. On the other hand, in the prior art 2, a method of analyzing defect factors in an electronic part packaging process is described, according to which quality data inputted at printing! mounting/soldering steps, respectively, in the electronic part packaging process are compared on a printed-circuit-board basis, to determine arithmetically the degree of influence of each of the above-mentioned steps exerted to the defectiveness of the finished product by referencing quality defectiveness regulation rules indicating possibilities of occurrence of defects in the individual steps.

Further, as the failure diagnosis techniques in which similar techniques are adopted, there may be mentioned, for example, those disclosed in JP-A-7-13517 (hereinafter referred to as the prior art 3) and JP-A-7-271587 (hereinafter referred to as the prior art 4). In the prior art 3, a method of estimating causes for unfavorable events is described, according to which phenomena representing statuses of unfavorable events and causes bringing about such unfavorable phenomena are compared on a phenomenon-by-phenomenon-basis for creating an association table in which there are defined association values indicating degrees of associations between phenomena and the relevant causes therefor, respectively, wherein phenomena taking place in accompanying an unfavorable event are discriminated and then values derived by weighing the association values relevant to the phenomena in accordance with a predetermined method are accumulatively summed up, and the cause for which the sum value is maximum is decided as the cause for the unfavorable event by referencing the association table. On the other hand, in the prior art 4, a failure diagnosis apparatus is described which is so arranged that a hypothesis is framed by investigating unfavorable phenomenon by making use of knowledge database stating definitely causes for failures and unfavorable phenomena, whereon the hypothesis mentioned above is verified by resorting to a knowledge database implemented by analyzing theoretically the causality relations between the unfavorable phenomena and the causes therefore.

All of the prior arts 1, 2, 3 and 4 mentioned above are directed to the techniques for estimating the causes having direct influence to the failure or defect event on the basis of the phenomena taken place actually in the past for allowing the proper remedying or repairing measures to be taken speedily at the time point of occurrence of failure phenomenon on the basis of the event actually taken place.

On the other hand, as a method or procedure for performing in advance a quality evaluation of an article to be manufactured before failure has actually occurred, there is known an FMEA (Failure Mode and Effects Analysis) technique (described in NIRKAGIREN: Reliability Engineering Ser. 7 "PRACTICAL USE OF FMEA, FTA") which is primarily adopted at the stage of designing a product or article to be manufactured. According to this procedure, an evaluator himself or herself predicts failure phenomena which may occur in association with individual component parts constituting a product and summarizes the "failure phenomena relating to the individual parts in the form of a table. Thus, by referencing the table, the evaluator himself or herself can predict "what sort of influence a product to be manufactured will suffer when a failure takes place". In this way, high-quality design having substantially no unintentional omissions can be realized.

Further, in conjunction with the FMEA method, there is known a procedure for estimating the degree of seriousness of defects and failures relating to individual component parts by determining the probability of occurrence of failure phenomena (defective ratios) as estimated by the evaluator in conjunction with the individual parts, whereon the degree of seriousness of defect of the product to be manufactured which can be regarded as being ascribable to the defect(s) of the individual parts is estimated, as in the case of FMECA (Failure Mode, Effects and Criticality Analysis) technique.

Additionally, there are known so-called subcontractor factory inspection/check sheet schema adopted generally by various enterprises for checking the subcontractors' factories for evaluating the factories' facility levels capable of manufacturing products of quality to be satisfied. Further, as other techniques for evaluating the productivities of the factories, there are known "factory diagnosis apparatus" (JP-A-9-62309) (prior art 5), and "diagnosis system for factories for packaging works" (JP-A-10-79599) (prior art 6).

SUMMARY OF THE INVENTION

However, none of the conventional methods or techniques mentioned above, i.e., the techniques for estimating the causes exerting influences straightforwardly to the failures or defects on the basis of the events which took place in the past, the FMEA method and the FMECA method, is not in the position to estimate the potential of failure to occur in a given product with high accuracy, because of the necessity to grasp substantially whole of the failure phenomena which may actually occur.

Such being the circumstances, in the current state of the art, not a few failures actually take place in the manufacturing works due to omission of examination and study, presenting one of the causes for deterioration of the quality of the manufactured articles.

Further, the subcontractor factory inspection! check sheet schema mentioned previously is inherently designed for evaluating organization and system of the factory under evaluation as to the facilities for the development, manufacture, quality securement and the like. However, it is impossible to estimate quantitatively the failure occurrence likelihood of the factory under evaluation on the basis of the results of the evaluation. Furthermore, with the prior art 5 and 6 which are designed for evaluating the productivity of the factory, the evaluation as to the failure occurrence likelihood in the manufacturing workshop is also impossible.

As is apparent from the above, none of the prior techniques which are directed to the manufacturing workshops as described above has adequate faculty for evaluating quantitatively the failure occurrence likelihood of the manufacturing workshop. Thus, great difficulty will be encountered in evaluating, for example, two given factories as to which of them has higher failure occurrence likelihood.

With the present invention, it is contemplated to solve the problems described above by providing a product quality evaluating method which makes it possible to evaluate/ estimate the failure occurrence likelihood of a manufacturing workshop (including a factory) which is scheduled to manufacture a given product by performing manufacturing works such as assembling, processing and/or the like at a premanufacturing stage such as a designing stage, a manufacturing process planning stage or the like, to thereby allow the quality such as, for example, work-related defective ratio and the like of the given product to be manufactured through a series of manufacturing works in the above-mentioned manufacturing workshop. With the present invention, it is also contemplated to provide an apparatus for carrying out the method mentioned above and a recording medium for storing the same.

Another object of the present invention is to provide a method of evaluating the failure occurrence likelihood of a manufacturing workshop, which method makes it possible to evaluate/estimate failure occurrence likelihood of a manufacturing workshop (including a factory) which is scheduled to manufacture a given product by performing manufacturing works such as assembling and/or the like at a premanufacturing stage such as a designing stage, a manufacturing process planning stage. With the present invention, it is equally contemplated to provide an apparatus for carrying out the method mentioned above and a recording medium storing the same.

For achieving the objects mentioned above, the present invention provides a method and an apparatus for evaluating a failure occurrence likelihood of a manufacturing workshop which feature a workshop database preparation process for creating in advance a workshop evaluating database to be stored for preparation, which database indicates correspondence relations between a plurality of workshop-conditioned failure influential items set previously and failure occurrence ratio indexes at least for standard manufacturing works at standard workshop facility levels for the workshop-conditioned failure influential items, respectively, and a workshop evaluating process for extracting from the workshop evaluating database prepared in the workshop database preparation process those failure occurrence ratio indexes which correspond to workshop facility levels of an inputted evaluation-undergoing manufacturing workshop for the workshop-conditioned failure influential items thereof, respectively, wherein the extracted failure occurrence ratio indexes are to realized over a plurality of concerned workshop-conditioned failure influential items to determine arithmetically the indexes indicating the failure occurrence ratios for the standard manufacturing works, respectively, in the evaluation-undergoing manufacturing workshop, to thereby evaluate/estimate the failure occurrence likelihood (fraction defective) in the manufacturing workshop undergoing the evaluation.

Further, the present invention features a workshop facility level inputting process for inputting at least workshop facility levels of the evaluation undergoing manufacturing workshop for the workshop-conditioned failure influential items, respectively. Further, the present invention features that the aforementioned workshop evaluating database created in the workshop database preparation process of the method and apparatus for evaluating the failure occurrence likelihood of the manufacturing workshop described previously is such a database which indicates correspondence relations between workshop-conditioned failure influential items set previously concerning worker(s), manufacturing equipment, manufacturing conditions, physical environment for manufacturing and management on one hand and on the other hand failure incurrence indexes representing failure occurrence suppressing abilities, failure coping time rate indexes representing failure occurrence coping abilities and defective extraction indexes representing failure detecting abilities for standard manufacturing works, respectively, at least at standard workshop facility levels for the workshop-conditioned failure influential items, respectively.

Furthermore, the present invention features that in the workshop evaluation process of the method and apparatus for evaluating the failure occurrence likelihood of the manufacturing workshop described previously, the three extracted indexes are totalized to thereby arithmetically determine indexes indicating failure occurrence ratios for the workshop-conditioned failure influential items, respectively, and that the arithmetically determined indexes indicating the failure occurrence ratios are totalized over a plurality of concerned workshop-conditioned failure influential items to thereby determine arithmetically the indexes indicating the failure occurrence ratios for the standard manufacturing works, respectively, in the evaluation-undergoing manufacturing workshop.

Furthermore, the present invention features that in the workshop evaluation process of the method and apparatus for evaluating the failure occurrence likelihood of the manufacturing workshop described previously, the workshop-conditioned failure influential items are mutually imparted with relative weights.

Furthermore, the present invention features that in the workshop database preparation process of the method and apparatus for evaluating the failure occurrence likelihood of the manufacturing workshop described previously, the workshop-conditioned failure influential items concerning the worker(s), the manufacturing equipment, the manufacturing conditions, the physical environment for manufacturing and the management are each subclassified into a plurality of items for each of the worker(s), the manufacturing equipment, the manufacturing condition, the physical environment for manufacturing and the management, respectively.

Furthermore, the present invention features that the method and apparatus for evaluating the failure occurrence likelihood of the manufacturing workshop described previously further includes an output process for outputting results (workshop failure occurrence likelihood index, results of evaluation concerning evaluation category-based workshop facility, improvement advices, etc.) of evaluation/estimation as executed by the workshop evaluating process.

Furthermore, the present invention provides a method and apparatus for evaluating a quality of a product, which feature a workshop database preparation process for creating in advance a workshop evaluating database to be stored for preparation, which database indicates correspondence relations between a plurality of workshop-conditioned failure influential items set previously and failure occurrence ratio indexes at least for standard manufacturing works at standard workshop facility levels for the workshop-conditioned failure influential items, respectively, a workshop evaluation process for extracting from the workshop evaluating database prepared in the workshop database preparation process those failure occurrence ratio indexes which correspond to workshop facility levels of an inputted manufacturing workshop for the workshop-conditioned failure influential items thereof, respectively, wherein the failure occurrence likelihood (workshop supplementary constant (workshop-related fraction defective)) for the standard manufacturing works in the manufacturing workshop by totalizing the above-mentioned extracted failure occurrence ratio indexes over a plurality of concerned workshop-conditioned failure influential items to thereby determine arithmetically the indexes indicating the failure occurrence ratios for the standard manufacturing works (typified by simplest downward-movement work in the case of an assembling work), respectively, in the manufacturing workshop, results of the evaluation and estimation being stored as a workshop index in a product evaluating database, and a product evaluating process for evaluating/estimating a quality indicating a work-related defective ratio of a product manufactured through a plurality of manufacturing works in the above-mentioned manufacturing workshop by using the workshop index concerning the manufacturing workshop as stored in the product evaluating database in the above-mentioned workshop evaluating process.

Furthermore, the present invention features that the aforementioned method of evaluating a quality of a product and the aforementioned apparatus for carrying out the same further includes a product database preparation process for storing in advance for preparation in a product evaluating database the indexes indicating fractions defectives in a plurality of mutually differing standard manufacturing operations, respectively, and supplementary indexes which are based on properties of component parts involved in the standard manufacturing operations, respectively, and a product input process for inputting standard manufacturing operations inclusive of properties of the component parts involved in individual manufacturing works, respectively, over a plurality of manufacturing works for manufacturing a product, wherein in the aforementioned product evaluating process, the indexes indicating the fractions defectives and the supplementary indexes (supplementing coefficients) are extracted from the product evaluating database prepared in the product database preparation process on the basis of the standard manufacturing operations inclusive of[]the properties of the component parts in the individual manufacturing works as inputted in the product input process, and wherein the extracted indexes indicative of the fractions defectives are supplemented with the extracted supplementary indexes mentioned above and the supplementarily corrected indexes indicating the fractions defectives are synthesized throughout a plurality of manufacturing works, whereon the synthesized index indicative of the fraction defective or the index indicative of the above-mentioned individual extracted fraction defectives is supplementarily corrected with the workshop index (workshop supplementary constant) stored in the aforementioned workshop evaluating process for thereby evaluating estimating the quality of the aforementioned product indicative of the work-related defective ratio.

Further, the present invention provides a recording medium which features that a program for executing the manufacturing workshop failure occurrence likelihood evaluating method or the product quality evaluating method is recorded on the recording medium.

As is apparent from the foregoing description, with the arrangements described above, the failure occurrence ratio in manufacturing a product is determined in dependence on the structural conditions of the product to be manufactured and the workshop conditions or statuses of the manufacturing workshop where the product is to be manufactured.

Thus, the estimated value of the fraction defective ascribable to the assembling or processing is to be arithmetically determined on the basis of the information concerning the factors which exert influence to the probability that a human being or worker can not perform the operations involved in the manufacturing work without fail (hereinafter referred to as the uncertainty). Of the factors which exerts influence to the probability that the human being or worker is incapable of performing the operations involved in the manufacturing work without fail, there exist roughly two types of factors, i.e., one is difficultness of the manufacturing work due to the structure of the product and the other is the environment of the workshop. Such being the circumstances, the present invention teaches that firstly the extent to which the fraction defective of a product is caused to increase by the structural conditions of a product under evaluation is estimated on the basis of the information concerning the contents of operations involved in the manufacturing works for manufacturing the product and the information concerning the properties of component parts for the product to be manufactured, and secondly the extent to which the manufacture-related fraction defective is caused to increase by the environmental conditions of the workshop destined for manufacturing the abovementioned product is estimated on the basis of the information indicating the facility status of that workshop for one or more workshop's environmental conditions which provide the causes for failure occurrence, whereon the fraction defective which will be incurred when the above-mentioned product is manufactured in the above-mentioned manufacturing workshop is estimated.

The method of estimating to what extent the manufacture-related fraction defective is caused to increase by the structural conditions of the product under evaluation can be implemented in an exemplary implementation mode of the invention by arithmetically determining the estimated value of the fraction defective of the product on the basis of the information concerning the contents of operations involved in the manufacturing work (part attaching work in the case of an assembling work) and the information concerning the properties of the component part or parts.

To this end, in the case of assembling work, the species or types of operations required for specifying the contents of the operations involved in the part attaching works (operation for downward movement, operations for horizontal movements and the like which will collectively be referred to as the standard attaching operations) are determined, and numerical values indicating low or high probabilities of the standard attaching operations being not performed without fail under predetermined conditions including "condition imposed by a worker, conditions imposed by component parts and conditions imposed by a workshop" (these conditions will be referred to as the standard conditions) is determined or set for each of the determined standard attaching operations. (The numerical values mentioned above will be referred to also as the standard-attaching-operation-based fraction defective coefficients.) Incidentally, by expressing the objective for evaluation in terms of a combination of the preset standard attaching operation elements, manipulability of a user interface could be enhanced. Furthermore, the present invention also teaches with a view to enhancing the accuracy of estimating the assembling-related fraction defective that in addition to the aforementioned standard attaching operation elements employed for taking into consideration the contents of attaching operations involved in the part attaching work, properties of the component parts (attachment-destined part and attachment-subjected part) which exert influence to the uncertainty of the attaching operation are expressed in terms of part-condition-related supplementary factors mentioned below, whereon the estimated value of the assembling-related fraction defective is arithmetically determined on the basis of the part-condition-related supplementary factors. More specifically, the factors exerting influence to the uncertainty of attaching work performed by a worker among the properties of the component parts (these factors will hereinafter be referred to as the part-condition-related supplementary factors) are determined, whereon for each of these influential factors as determined, a numerical value indicating the degree of the influence exerted by the influential factor to the attaching operation (this numerical value will hereinafter be referred to as the part condition supplementing coefficient) is determined. For the part attaching operation subjected to the assembling-related fraction defective estimation, the contents of the attaching operation are expressed by those preset part-condition-related supplementary factors which are pertinent to the properties of the component parts involved in the part attaching work of concern and which are selected from the preset part-condition-related supplementary factors mentioned above, in addition to the expression in terms of combination of the standard attaching operations as mentioned above.

BRIEF DESCRIPTION OF THE DRAWINGS

FIG. 4 is a view for illustrating in concrete the contents of a manufacturing workshop evaluating database stored in a storage unit shown in FIG. 3.

FIGS. 7A and 7B are views showing, respectively, a screen image for enabling selection of creation of a new file or opening of an existing registered file and a screen image enabling file designation.

FIG. 8 is a view showing an example of an input screen image enabling input of a name of a workshop which is to undergo a workshop evaluation and workshop facility levels for each of evaluation categories and each of workshop-conditioned failure influential items.

FIG. 10 is a view showing failure occurrence ratios of the workshop as a whole and fraction defectives of workshops as a whole for each of the evaluation categories and each of the workshop-conditioned failure influential items as the result of the evaluation performed by executing the processings illustrated in FIG. 9.

FIG. 11 is a view showing an example of screen image onto which the result of workshop evaluation is outputted.

DESCRIPTION OF THE EMBODIMENTS

Description will now be made of implementation modes or embodiments for implementing or carrying out the evaluation of manufacturing workshops according to the present invention by reference to the drawings.

The quantitative evaluation performed by resorting to the manufacturing workshop evaluating procedure taught by the present invention makes it possible to estimate a failure occurrence likelihood (probable fraction defective or percent defective) in a workshop even in the case where real record data concerning actual occurrence of defectives or failures is unavailable. In other words, with the quantitative evaluation based on the manufacturing workshop evaluating procedure taught by the present invention, it has been established that the failure occurrence likelihood in manufacturing workshops can coincide approximately with the real defective record data.

The failure occurrence likelihood (fraction defective or failure occurrence ratio) in a manufacturing;!workshop, i.e., the ability or faculty of the manufacturing workshop to say in another way, can be given by the expression "failure occurrence suppressing ability" X "failure occurrence coping ability" X "failure detecting ability".

Figure 1:
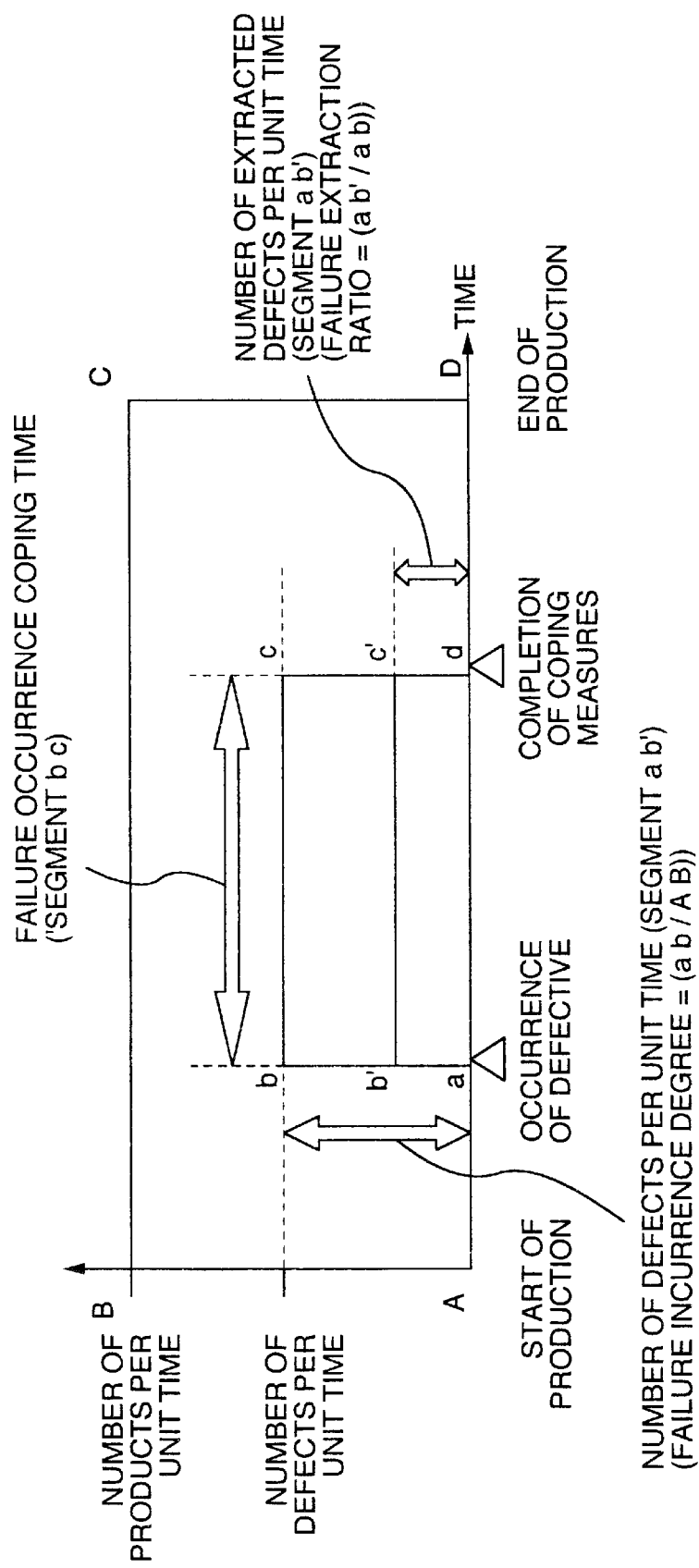
FIG. 1 is a view for illustrating "failure incurrence degree", "failure coping time" and "defective extraction ratio" on the basis of which failure occurrence likelihood of a manufacturing workshop is determined according to the present invention.

With the phrase "failure occurrence suppressing ability", it is contemplated to mean the ability of a workshop for manufacturing articles without incurring defectives. In more concrete, referring to FIG. 1, the failure occurrence suppressing ability can be represented in terms of failure incurrence ratio or degree=(ab)/(AB). Further, the phrase "failure occurrence coping ability" is to mean the ability or capability of a workshop for preventing the occurrence of defectives within a time as shortest as possible upon occurrence of a failure event. The failure occurrence coping ability may be expressed in terms of the extent of the time taken for coping with the failure which time intervenes between a time point of occurrence of a defective and a time point at which measures for coping with such failure event has been completely effectuated, as can be seen in FIG. 1. Finally, with the phrase "failure detecting ability", it is intended to mean the ability or faculty of a given manufacturing workshop for detecting (or extracting) a defective for thereby preventing the defective from being fed from the given manufacturing workshop to a workshop in charge of post-processing or post-treatment. Referring to FIG. 1, this failure detecting ability can be represented by a defective extraction ratio=(ab')/'(ab).

Thus, by calculus of "failure occurrence suppressing ability" X "failure occurrence coping ability" X "failure detecting ability" for a standard manufacturing work (e.g. standard assembling work such as typified by simplest downward-movement work in the case of an assembling work), the real ability or faculty of a manufacturing workshop can be evaluated.

In this conjunction, it is noted that a manufacturing workshop is composed of a worker or workers who engage in manufacturing work(s), an overseer who is in charge of controlling (managing) the workers, manufacturing equipment such as tools, jigs, production line equipment or the like which are used for carrying out manufacturing works, and workshop environments for the workers and others such as the ambient temperature, humidity, brightness or illumination, noise, etc. From the studies conducted by the inventors of the present application, it has been made clear that as the factors or causes for the occurrence of failures (or as the categories of failure occurrences) observed in the manufacturing workshop can be classified into factors which relate to the workers, factors which relate to the manufacturing equipment, factors which relate to the manufacturing conditions such as production line speed, production lot numbers per unit time and the like, factors which relate to the physical manufacturing environment and factors which relate to the management of the manufacturing workshop or the like.

In this conjunction, however, it is impossible to establish correspondences between these failure incurrence factors in a manufacturing workshop on one hand and "failure incurrence degree representing the failure occurrence suppressing ability", "failure coping time rate representing the failure occurrence coping ability" and "defective extraction ratio representing the failure detecting ability" on the other hand. Such being the circumstances, there has arisen the necessity for subdivided classification or subclassification of the aforementioned factors into the workshop-conditioned failure influential items which allow correspondences to be established with "failure incurrence degree representing the failure occurrence suppressing ability", "failure coping time rate representing the failure occurrence coping ability" and "defective extraction ratio representing the failure detecting ability", respectively.

As the workshop-conditioned failure influential items (evaluation-destined elements) subclassified with regard to the manufacturing worker(s), there can be mentioned the percentage attendance of the worker(s) engaged in manufacture, worker's propensities and faculty, worker's skillfulness level, work-relating instructions/commands system for the worker(s) and the like.

As the workshop-conditioned failure influential items (evaluation-destined elements) subclassified with regard to the manufacturing equipment, there can be mentioned performance and reliability of the equipment, equipment control/management scheme inclusive of maintenance, mandatory level imparted to a person in charge of managing the equipment and the like.

As the workshop-conditioned failure influential items (evaluation-destined elements) sub-classified with regard to the manufacturing conditions, there can be mentioned production facilities or requirements such as the production line speed, production lot numbers per unit time and the like. As the workshop-conditioned failure influential items subclassified with regard to the physical manufacturing environment, there may be mentioned such physical environmental conditions as the ambient temperature, humidity, brightness or illumination, noise, etc.

As the workshop-conditioned failure influential items (evaluation-destined elements) subclassified with regard to the management of the manufacturing workshop, there may be mentioned education/training of the workers, instructions concerning the works and distribution thereof to the workers, failure occurrence coping measures, work checking methods and the like.

Figure 2:
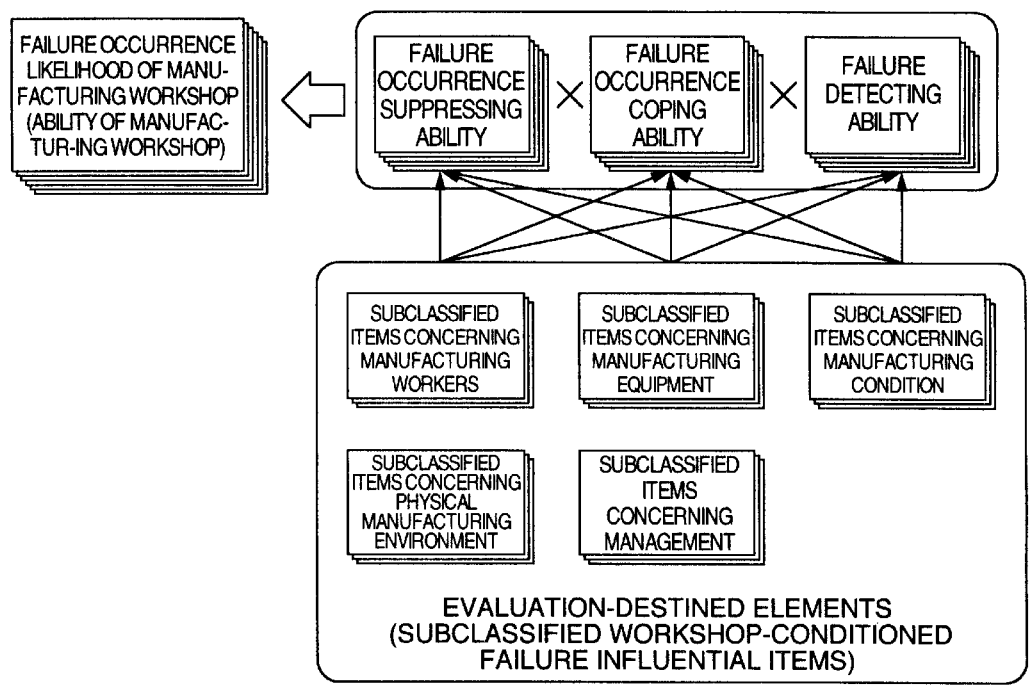
FIG. 2 is a view for illustrating that "failure occurrence suppressing ability", "failure occurrence coping ability" and "defective detecting ability" which can determine failure occurrence likelihood of a manufacturing workshop according to the teachings of the present invention bear relations to various evaluation-destined elements (subclassified workshop-conditioned failure influential items).

By providing or setting the workshop-conditioned failure influential items (evaluation-destined elements) subclassified as described above, there can be established the correlations with "failure incurrence degree", "failure coping time rate" and "defective extraction ratio", as indicated by arrows in FIG. 2. Thus, by preparing in advance a workshop evaluating database 4a1 (illustrated in FIG. 3) which is composed of the failure incurrence coefficients, defective extraction ratio coefficients, failure coping time coefficients and inter-item relative weighing coefficients which represent the failure occurrence ratio coefficients at a standard level (e.g. a highest unlikelihood level of the failure occurrence) for a standard manufacturing work (e.g. downward-movement work simplest in the case of an assembling work) for each of the items mentioned above, it becomes possible to estimate the failure occurrence to likelihood (failure occurrence ratio) of a manufacturing workshop, i.e., the real ability of the manufacturing workshop. In other words, by setting the workshop-conditioned failure influential items subclassified, it is possible to determine in advance for each of these items the failure occurrence ratio coefficients represented by the failure incurrence coefficient, the defective extraction ratio coefficient and the failure coping time coefficient as well as the inter-item relative weighing coefficients at the standard level which indicate correlations with "failure incurrence degree", "failure coping time rate" and "defective extraction ratio" for a standard manufacturing work. Parenthetically, the inter-item relative weighing coefficient may be included in the failure occurrence ratio coefficient.

In this conjunction, as a method of creating the workshop evaluating database, it is conceivable to arithmetically determine the failure occurrence ratio coefficients represented by the failure incurrence coefficient, the defective extraction ratio coefficient and the failure coping time coefficient as well as the inter-item relative weighing coefficients at the standard level of each of the workshop-conditioned failure influential items on the basis of the failure incurrence degree, the defective extraction ratio and the failure coping time rate which represent the failure occurrence ratio for a standard manufacturing work and which are actually measured at a representative one of the manufacturing workshop (s) for standard levels of the workshop-conditioned failure influential items, respectively. In this conjunction, it goes without saying that in this case, the failure occurrence likelihood (failure occurrence ratio) of the representative manufacturing workshop, i.e., total sum of the failure occurrence ratios which indicates the real ability or faculty of the representative workshop as well as the fraction defective thereof are actually measured as well.

By creating or preparing in advance the manufacturing workshop evaluating database on the basis of the actually measured values in the representative manufacturing workshop as elucidated above, it is possible to carry out the estimation-based evaluation concerning the real abilities (sum total of the failure occurrence ratios and workshop-based fractions defectives) of various manufacturing workshops simply by inputting the levels of the workshop-conditioned failure influential items, respectively. Incidentally, the inventors of the present application have confirmed that the actually measured values coincide approximately with the estimated values in a plurality of other manufacturing workshops than the representative one.

As will now be understood from the foregoing, it is possible to carry out the estimation-based evaluation concerning the real abilities (sum total of the failure occurrence ratios and workshop-based fraction defective) of various manufacturing workshops solely by inputting the levels of the workshop-conditioned failure influential items relevant to the various manufacturing workshops, respectively. The estimated real abilities of the manufacturing workshops may be registered as workshop constants (indexes indicating the real reliabilities of individual manufacturing workshops for the manufacturing works) in a product structure evaluating database (work objectives evaluating database) 4b1 shown in FIG. 3, to thereby allow the fraction defectives concerning products or articles manufactured (e.g. assembled) at manufacturing workshops of concern to be estimated, as described in JP-A-10-334151.

Now, description will be directed to a method of carrying out the estimation-based evaluation concerning the real abilities (sums total of the failure occurrence ratios and the workshop-based fractions defectives) of various manufacturing workshops, respectively, solely by inputting the level of each of the workshop-conditioned failure influential items according to an embodiment of the present invention.

Figure 3:
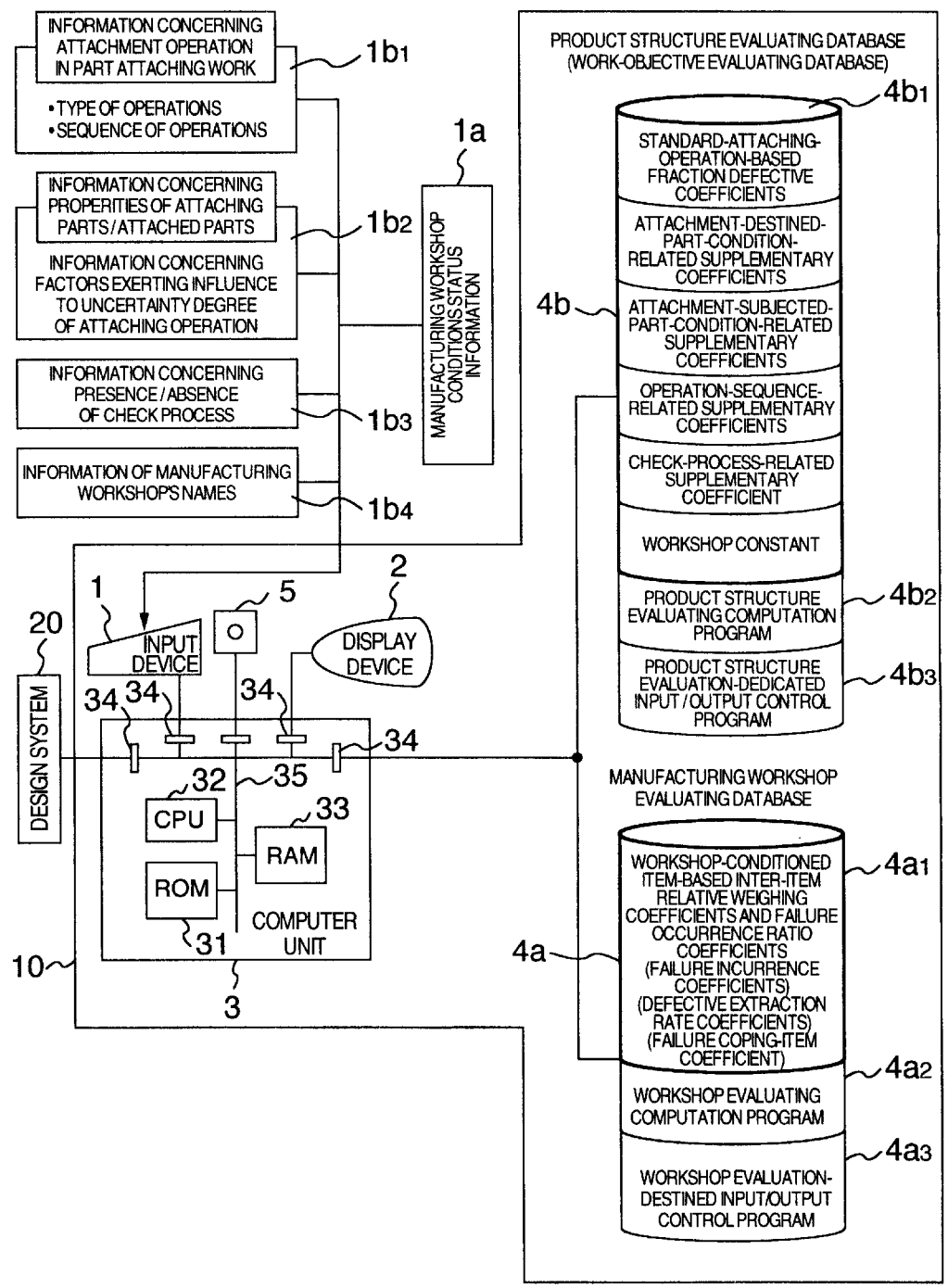
FIG. 3 is a hardware arrangement diagram showing an exemplary embodiment of an evaluation apparatus according to the present invention which includes a workshop evaluating unit and a product evaluating unit.
Figure 13:
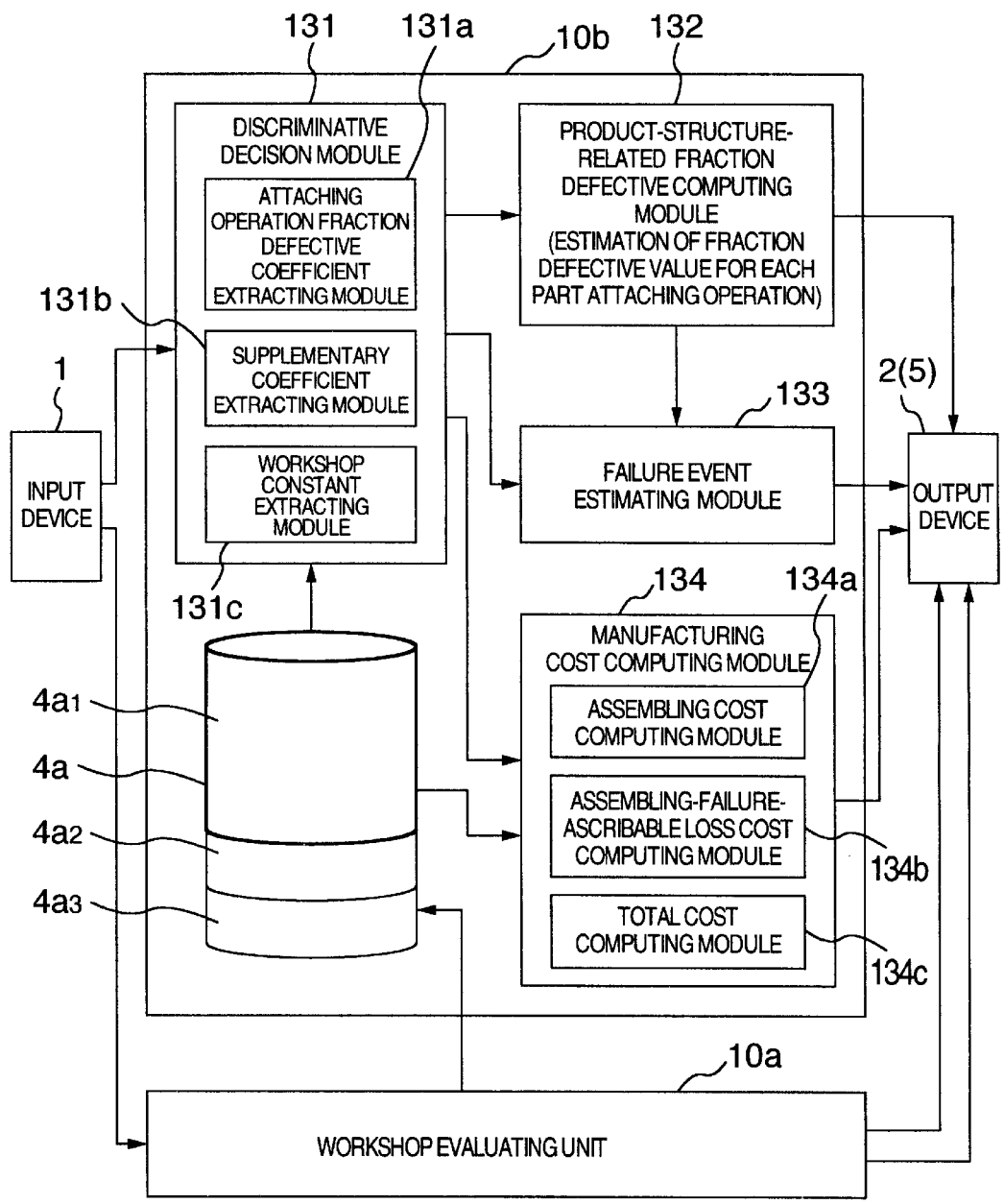
FIG. 13 is a functional block diagram showing a functional structure of the product evaluating unit incorporated in the evaluation apparatus according to the present invention.

FIGS. 3 and 13 is a configuration diagram showing an exemplary embodiment of the present invention which is directed to a workshop evaluating unit 10a designed for evaluating through estimation the real abilities (sum totals of the failure occurrence ratios and workshop-based fractions defectives) of the manufacturing workshops and a product evaluating unit (manufacturing work evaluating unit) 10b for estimating the fraction defective upon manufacturing of a product or component parts of the product at a manufacturing workshop(s). In the description which follows, it is presumed that a product or article is manufactured through assembling process and thus the assembling implicitly means the manufacturing. Parenthetically, the product evaluating unit 10b designed for estimating the fraction defective in the manufacture of a product or subassemblies thereof is described in JP-A-10-334151. Accordingly, description of the product evaluating unit will be made only briefly.

The evaluation apparatus 10 according to the present invention is comprised of an arithmetic unit 3 which in turn is constituted by a CPU 32 connected to a bus 35, a ROM 31 storing a predetermined program or programs therein, a RAM 33 designed for storing temporarily various sorts of data and the like, an input means 1 connected to the arithmetic unit 3 by way of an interface 34, a display means 2, a storage unit 4a and b and an output unit 5. The input means 1 is constituted by a keyboard, a mouse, a recording medium, a network and/or the like so that part attaching operation information 1b1 concerning the attaching work of component parts, information 1b2 concerning properties of attachment-destined parts and attachment-subjected parts, check process presence/absence information 1b3 and manufacturing workshop's name or identifier information 1b4 as well as manufacturing workshop conditions or statuses information la required for evaluation of the manufacturing workshop and the like can be inputted. The display means 2 is so designed that it can display an input operation aiding or prompting image upon inputting of various information with the input means 1, results of evaluation performed for manufacturing workshops (diagnosis data, improvement advices and others) and results of evaluation (fraction defective of products or articles, failure phenomena, manufacturing cost and others) concerning a product structure (objective for manufacturing work). The storage unit 4 is comprised of a manufacturing workshop evaluation-dedicated storage area 4a where a manufacturing workshop evaluating database 4a1, a manufacturing workshop evaluating computation program 4a2 and a manufacturing workshop evaluating input/output control program 4a3 are stored on one hand and a product structure evaluation-dedicated storage area 4b where a product structure evaluating database 4b1, a product structure evaluating computation program 4b2 and a product structure evaluation-dedicated input/output control program 4b3 are stored on the other hand. The output unit 5 is constituted by a recording medium, a network or the like which is provided separately from the display means 2 so that the output unit can output the results of evaluation concerning the manufacturing workshop and the results of evaluation concerning the product structure. Further, the evaluation apparatus 10 is connected to a design system 20 by way of a network or through the medium of a recording medium or the like so that design data concerning products or articles to be manufactured can be inputted to the evaluation apparatus.

As is apparent from the above, the evaluation apparatus 10 according to the present invention is composed, from the functional standpoint, primarily of the workshop evaluating unit 10a (shown in FIG. 5) which is designed to perform processings for evaluating the failure occurrence ratios of the manufacturing workshops and the product evaluating unit 10b (shown in FIG. 13) which is designed to evaluate the fractions defectives of products or articles manufactured by the manufacturing workshops. In this conjunction, it is to be mentioned that the workshop evaluation can be effectuated only with the aid of the workshop evaluating unit 10a. However, by coupling functionally the workshop evaluating unit 10a with the product evaluating unit 10b for thereby making available both the evaluation information concerning the failure occurrence ratio of the manufacturing workshop as determined by the workshop evaluating unit 10a and the evaluation information concerning the fractions defectives of the products or articles as determined by the product evaluating unit 10b, it is possible to estimate the fraction defective in more concrete terms for a given product manufactured at a given manufacturing workshop.

The evaluation apparatus 10 according to the present invention is so arranged as to select a large number of the status items (workshop-conditioned failure influential items) which exert especially influence to the failure occurrence ratio from the various status conditions relevant to the manufacturing workshop, to thereby determine for each of the selected workshop-conditioned failure influential items the values each indicating magnitude of the influence which the selected item exerts to the failure occurrence ratio (i.e., the "failure occurrence ratio coefficients" comprised of "failure incurrence coefficient", "defective extraction ratio coefficient" and "failure coping time coefficient" and the "inter-item relative weighing coefficients") of the manufacturing workshop at the standard level of the workshop status, whereon the values mentioned above are stored in the workshop evaluating database 4a1, whereas the arithmetic means 3 is so designed as to read out the "failure occurrence ratio coefficients" and the "inter-item relative weighing coefficients" which are set for the standard levels of the workshop-conditioned failure influential items, respectively, of a workshop under evaluation on the basis of the information indicating the level which the workshop under evaluation assumes for each of the numerous workshop-conditioned failure influential items contained in the various workshop statuses information inputted through the input device 1, to thereby arithmetically determine the failure occurrence ratio and the fraction defective in the manufacturing workshop under evaluation with regard to a large number of the workshop-conditioned failure influential items on the basis of the "failure occurrence ratio coefficients" and "inter-item relative weighing coefficients" as read out, whereon the failure occurrence ratio and the fraction defective as determined are registered in a workshop constant area of the product structure evaluating database 4b1 contained in the storage unit 4.

To this end, there is prepared in advance in the workshop evaluation-dedicated storage area 4a of the storage unit 4 the workshop evaluating database 4a1 which is composed of information 60 concerning the failure incurrence causes or factors (failure occurrence categories) in the manufacturing workshops, information 62 and 63 setting forth the contents of the workshop-conditioned failure influential items resulting from the subclassification of the failure incurrence factors (which information also contains information 63 describing the workshop status for every workshop facility (level)), information concerning the "failure occurrence ratio coefficient" 65 including "failure incurrence coefficient" 65a, "defective extraction ratio coefficient" 65b and "failure coping time coefficient" 65c and the "inter-item relative weighing coefficient" 64 at the standard level (e.g. level "1") for each of the standard manufacturing works set with regard to the workshop-conditioned failure influential items, respectively, and information 66 concerning advices for improvement (coping measures) for the cases where the failure occurrence ratio is remarkably unfavorable, which information is set at least for every failure incurrence factor or for every workshop-conditioned failure influential item of the manufacturing workshops, as can be seen in FIG. 4.

In the case of the exemplary manufacturing workshop evaluating database illustrated in FIG. 4, the subclassified workshop-conditioned failure influential item (No. 1) concerning the evaluation category "1" (manufacturing worker) represents the percentage attendance of the manufacturing worker, the subclassified workshop-conditioned failure influential item (No. 8) concerning the evaluation category "2" (manufacturing equipment) represents the determination of a person in charge of managing the equipment, and the subclassified workshop-conditioned failure influential item (No. 13) concerning the evaluation category "4" (physical manufacturing environment) represents brightness (illumination).

In succession, for each of the workshop conditioned failure influential is items 62, a plurality of levels (workshop facilities) 63 are set with reference to the standard level (e.g. level "1" (indicating a high level)). By way of example, in conjunction with the workshop-conditioned failure influential item "percentage attendance", three workshop facility levels are set, i.e., level "1" (indicating a high level) for "percentage attendance higher than 97% inclusive", "level "2" (indicating a medium level) for "percentage attendance higher than 90% inclusive and lower than 97%", and level "3" (low) for "percentage attendance lower than 90%". For the workshop-conditioned failure influential item "person in charge of managing the equipment", for example, there are set three workshop facility levels, i.e., level "1" for "all determined", "level "2" for "determined (for greater than 90% inclusive of all equipment)" and level "3" for "determined (for smaller than 90% of all equipment)". Further, for the workshop-conditioned failure influential item "illumination (L)", for example, there are set three workshop facility levels, i.e., level "1" for "L>1000 1×", "level "2" for "1000 1×>L>600 1×" and level "3" for "600 1×>L", respectively. In this manner, in the case of the illustrative manufacturing workshop evaluating database shown in FIG. 4, there are set three stages of levels 63, i.e., level "1" to level "3", as the workshop facility level for each of the workshop-conditioned failure influential items. In that case, the level "1" corresponds to the workshop status most insusceptible to the occurrence of failure while the level "3" corresponds to the workshop status most susceptible to the occurrence of failure, and the level "2" corresponds to the workshop status having an intermediate susceptibility to the occurrence of failure, i.e., intermediate level between the levels "1" and "3". In this conjunction, it is necessary to set the level for at least two workshop facilities for indicating the relevant workshop statuses although no upper limit is imposed especially. As the number of the workshop facilities as set increases, the evaluation accuracy can correspondingly be enhanced, to an advantage. However, increasing of the number of the workshop facilities will be accompanied with increase of the alternatives for selection upon information inputting, rendering the input operation troublesome more or less.

Further, for the standard manufacturing work (e.g. downward-movement operation simplest in the case of the assembling work) set with regard to each of the workshop-conditioned failure influential items 62, there are set the "failure occurrence ratio coefficient" 65 including "failure incurrence coefficient" 65a, "defective extraction ratio coefficient" 65b and "failure coping time coefficient" 65c as well as the "inter-item relative weighing coefficient" 64 at the standard workshop facility level (e.g. level "1"). By way of example, for the workshop-conditioned failure influential item "percentage attendance", there are set the "failure occurrence ratio coefficient" 65 composed of "failure incurrence coefficient" of "3", "defective extraction ratio coefficient" of "1" and "failure coping time coefficient" of "2" as well as the "inter-item relative weighing coefficient" of "2". Similarly, for the workshop-conditioned failure influential item "person in charge of managing the equipment", for example, there is set the "failure occurrence ratio coefficient" 65 composed of "failure incurrence coefficient" of "2", "defective extraction ratio coefficient" of "2" and "failure coping time coefficient" of "1" together with the "inter-item relative weighing coefficient" of "1". Further, for the workshop-conditioned failure influential item "illumination (L)", for example, there is set the "failure occurrence ratio coefficient" 65 composed of "failure incurrence coefficient" of "2", "defective extraction ratio coefficient" of "2" and "failure coping time coefficient" of "0" together with the "inter-item relative weighing coefficient" of "1". At this juncture, it should be mentioned that the inter-item relative weighing coefficient of "2" means that "failure occurrence ratio" is twice as high when compared with the other items. Similarly, the failure incurrence coefficient, the defective extraction ratio coefficient and the failure coping time coefficient of "2" or "3" means that the failure occurrence ratio is twice or three times as high when compared with those of "1". Further, the failure incurrence coefficient, the defective extraction ratio coefficient and the failure coping time coefficient each of "0" means that these coefficients play no role. Incidentally, these coefficients are all indicated, respectively, by integers for easy understanding. However, there is no necessity of indicating the values of these coefficients by integers.

Further, as the advices 66 for improvement (coping measures) and the comments 67 for the cases where the failure occurrence ratio is remarkably unfavorable at least for each of the failure occurrence factors (evaluation categories) or for each of the subclassified workshop-conditioned failure influential items, there are prepared a short-term measures plan and a long-term measures plan in dependence on levels "2" and "3" indicative of the unfavorableness of the failure occurrence ratio.

Figure 6:
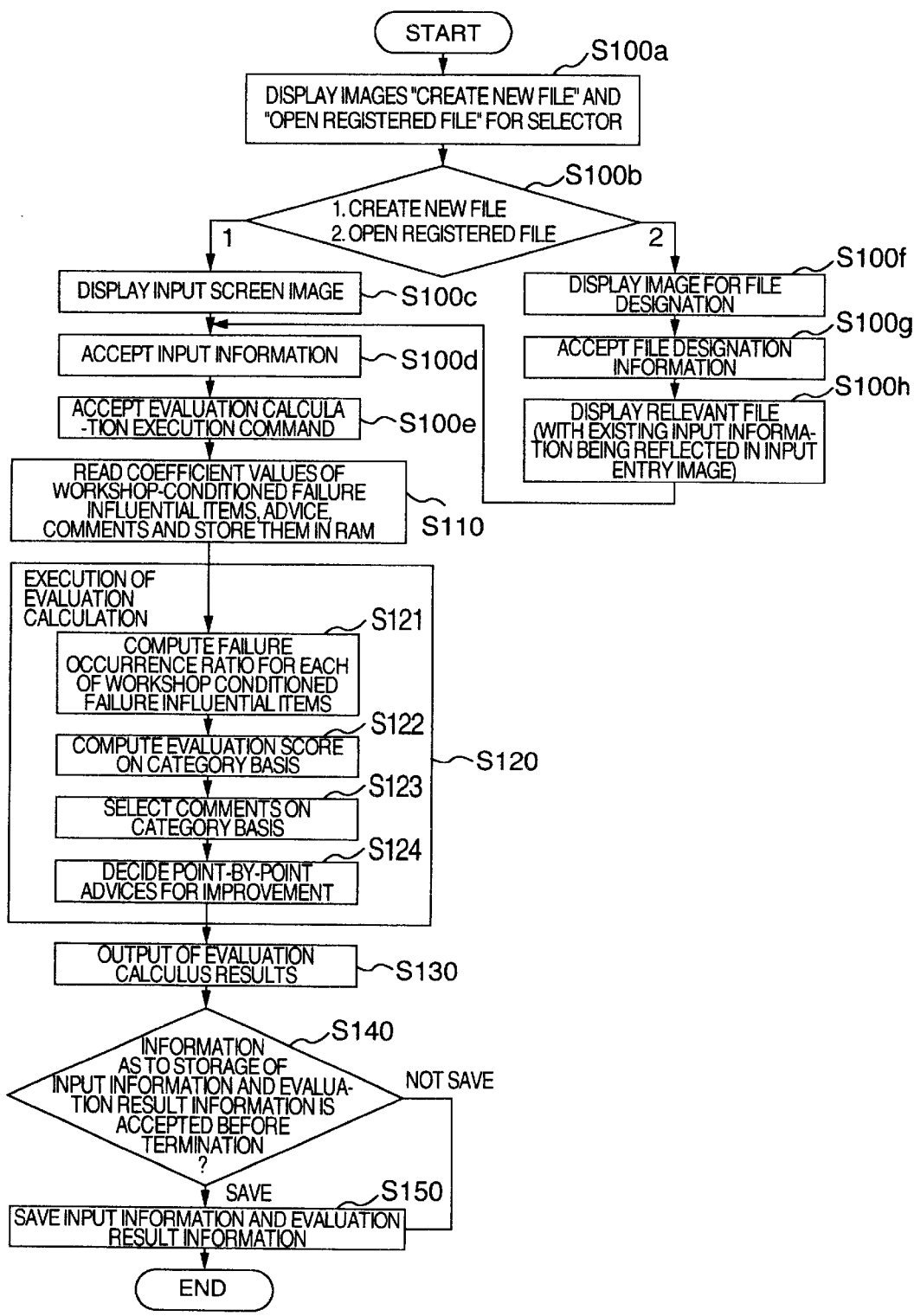
FIG. 6 is a view for illustrating as a whole a manufacturing workshop evaluation processing flow executed by the workshop evaluating unit according to the present invention.
Figure 9:
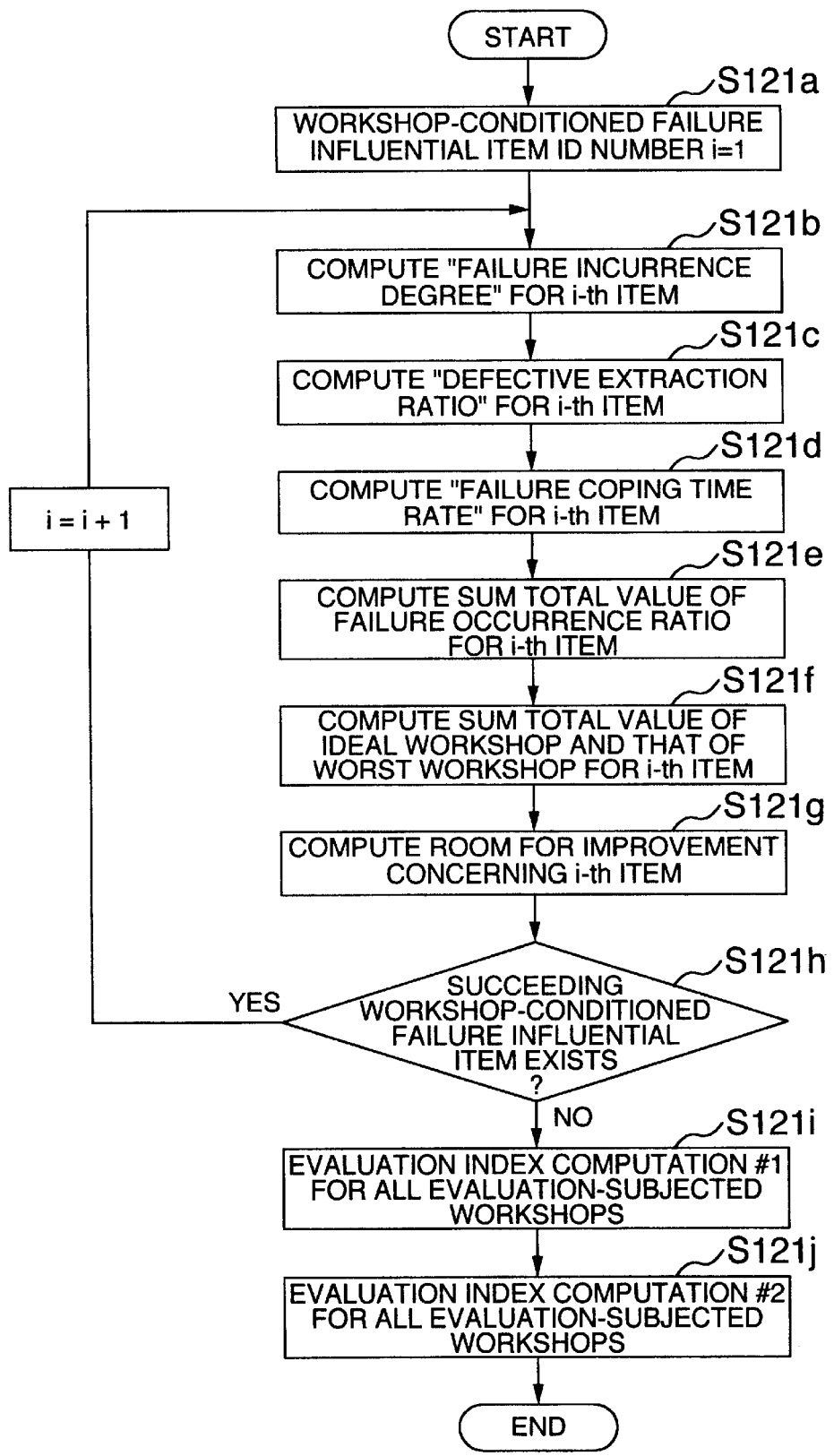
FIG. 9 is a view showing in the concrete a flow of arithmetic processings for evaluating failure occurrence ratios of a workshop as a whole and fractions defectives on an average of a workshop as a whole for each of the workshop-conditioned failure influential items shown in FIG. 7.

Next, referring to FIG. 6, description will be made of a processing flow for evaluating by estimation the real ability (sum total of the failure occurrence ratios and the workshop-related fraction defective) in the manufacturing workshop by making use of the workshop evaluating unit 10a.

In the first place, the manufacturing workshop conditions information 1a for a manufacturing workshop of concern which is to undergo the evaluation is inputted with the input device 1 (steps S100a–S100h). In more concrete, for the workshop-conditioned failure influential items, the relevant workshop facility levels are selectively inputted.

More specifically, when the evaluation apparatus according to the present invention is put into operation by an evaluator (e.g. a supervisor of the manufacturing workshops), then the arithmetic unit 3 has a display device 2 displaying an entry image 51 for allowing the evaluator to select either "create new file" 51a or "open registered file" 51b, as illustrated in FIG. 7A (step S100a). Incidentally, the registered file is opened in the case where a new manufacturing workshop is to be evaluated by referencing the manufacturing workshop evaluated once or in the case where the manufacturing workshop evaluated once is again subject to the evaluation.

Upon selection of "create new file" 51a by the evaluator (step S100b), the corresponding information is detected or recognized by the arithmetic unit 3, whereupon an input entry image 51 illustrated in FIG. 8 is displayed on the display device 2 (step S100c). On the other hand, when the evaluator selects "open existing file" 51b (step S100b), a file designation image 52 (shown in FIG. 7B) is displayed (step S100ff) for allowing the evaluator to designate a concerned file, whereupon the corresponding file designation information is accepted by the computer unit (step S100g), and the file designated by the evaluator is opened (with the existing relevant information being reflected in the input entry image 51) (step S100h).

Query items 75 and answer alternatives 76 constituting the input prompting information are displayed on the input entry image 70 by reading the information 62 concerning the workshop-conditioned failure influential item for each of the evaluation categories stored in the workshop evaluation-dedicated storage area 4a of the storage unit 4 and the information 63 concerning the workshop facility items also stored in the storage area 4a, being classified with the levels of the workshop-conditioned failure influential items, respectively. In this way, alteration of the items for evaluation and the workshop facilities being set can be realized solely by altering or modifying the information stored in the storage unit 4, which in turn means that reconfiguration as well as maintenance of the evaluation apparatus can be facilitated.

In succession, the evaluator can-input the information concerning the workshop which is to undergo the evaluation with the input device 1 while referencing the input entry image 70, which information is then accepted by the computer unit 3 to be temporarily stored, for example, in the RAM 33 (step S110). More specifically, the name "manufacturing workshop X" of the workshop subjected to evaluation is inputted. By pushing one of buttons 75a provided for supplementary explication of the query items (workshop-conditioned failure influential items 62) 75 for every evaluation category, a document containing definition of the corresponding query item is displayed within another window opened. By referencing this document, one of the workshop facility levels 76a to 76c displayed in the answer field 76 can be inputted by clicking. In other words, for each of the query items, i.e., for each of the workshop-conditioned failure influential items, there are displayed previously three answer alternatives (i.e., three facility levels of the workshop), and thus the information concerning the facility level of the workshop subjected to the evaluation can be inputted simply by clicking with a mouse a radio button affixed to the relevant facility level of the workshop under evaluation. In this way, the input operation is usually performed with the aid of the input device 1 such as a mouse, a keyboard or the like. However, the workshop information to be inputted may equally be fetched from other workshop-related information source stored in other storage unit through the medium of a computer network. Of course, the information inputting to the computer unit 3 can be realized by making use of a recording medium such as a floppy disk or the bike. To say in another way, any appropriate input arrangement can be adopted as occasion requires, so far as the search and retrieval of the information required for the evaluation can be implemented.

Upon completion of the input operation performed by the evaluator, the CPU 32 incorporated in the computer unit 3 detects or recognizes a command for execution of evaluation calculus to read out from the workshop evaluation-dedicated storage area 4a of the storage unit 4 on the basis of the workshop status information inputted and stored in the RAM 33 or the like the information concerning the "failure occurrence ratio coefficient" 65 composed of "failure incurrence coefficient" 65*a*, "defective extraction ratio coefficient" 65*b* and "failure coping time coefficient" 65*c* as well as the "inter-item relative weighing coefficient" 64 at the standard workshop facility level for the standard manufacturing work as set for each of the workshop-conditioned failure influential items, whereon the information read out is stored temporarily in the RAM 33 (step S110).

Figure 5:
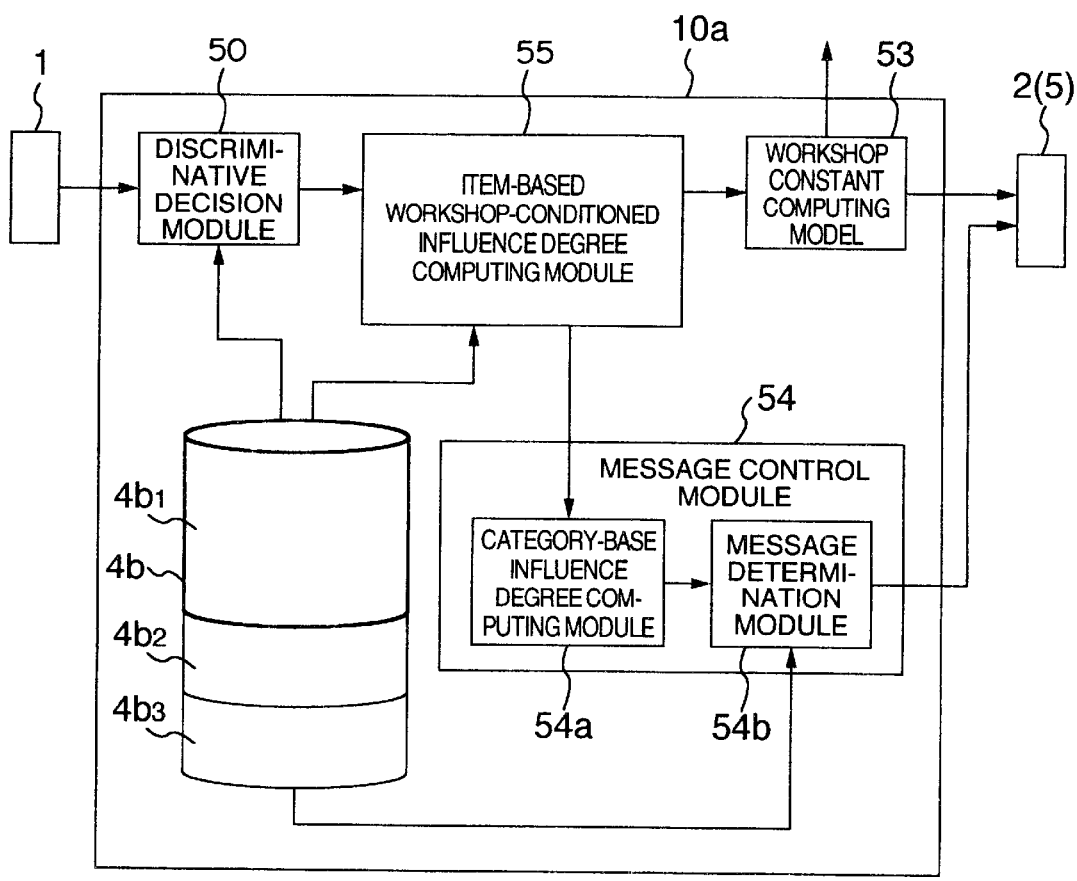
FIG. 5 is a functional block diagram showing a functional configurations of the workshop evaluating unit and the evaluation apparatus, respectively, according to an exemplary embodiment of the present invention.

A discriminative decision module 50 of the workshop evaluating unit 10*a* (computing means 3 incorporating the CPU 32) shown in FIG. 5 serves to identify or decide discriminatively the workshop facility level information inputted through the input means 1 for each of the workshop-conditioned failure influential items to thereby search the information concerning the relevant "failure occurrence ratio coefficient" 65 and "inter-item relative weighing coefficient" 64 from the workshop evaluation-dedicated storage area 4*a* of the storage unit 4 by using as the search key the information about the ID number indicating the workshop-conditioned failure influential item and the information indicating the workshop facility level, whereon the information searched is read out to be stored temporarily in the RAM 33. This processing is carried out repetitively for all the workshop-conditioned failure influential items involved in the evaluation.

Description will now be made by reference to the input prompting information illustrated in FIG. 8. In conjunction with the workshop-conditioned failure influential items, the workshop facility level "2" is inputted for "percentage attendance", the workshop facility level "3" is inputted for "person in charge of equipment" and the workshop facility level "1" is inputted for "illumination". On the basis of these input information, the CPU 32 of the workshop evaluating unit 10*a* according to the instant embodiment makes decision that the items designated by the workshop-conditioned failure influential item ID numbers "1", "8" and "13" are at the levels "level 2", "level 3" and "level 1", respectively, whereon by using as the search key both the workshop-conditioned failure influential item identifying number information "1", "8" and "13" and the workshop facility level indicating information "level 2", "level 3" and "level 1", the information concerning the workshop facility level coefficients for the relevant standard workshop facility level (failure occurrence ratio coefficient), i.e., the "failure occurrence ratio coefficient" 65 including "failure incurrence coefficient" 65*a*, "defective extraction ratio coefficient" 65*b* and "failure coping time coefficient" 65*c* and "inter-item relative weighing coefficient" 64 is retrieved from the failure occurrence ratio coefficient database stored in the workshop evaluation-dedicated storage area 4*a* of the storage unit 4 to be subsequently stored in the RAM 33. In the case of the database illustrated in FIG. 4, the workshop facility level coefficient (failure occurrence ratio coefficient) for the standard workshop facility level bears correspondence to the workshop facility level.

In succession, the CPU 32 (item-based workshop-conditioned influence degree computing module 55 shown in FIG. 5) incorporated in the computer unit 3 responds to designation of the workshop-conditioned failure influential item identifying number i in a step S121*a* by referencing the information concerning the workshop facility level coefficient (failure occurrence ratio coefficient) (indicated by the workshop facility level in FIG. 4) for the standard workshop facility level for each of the workshop-conditioned failure influential items in the manufacturing workshop X stored in the RAM 33, i.e., the information concerning the "failure occurrence ratio coefficient" 65 including "failure incurrence coefficient" 65*a*, "defective extraction ratio coefficient" 65*b* and "failure coping time coefficient" 65*c* as well as the "inter-item relative weighing coefficient" 64, to thereby compute for each of the workshop-conditioned failure influential items the failure occurrence ratio 92 (i.e., "failure incurrence degree" 92*a* (step S121*b*), "defective extraction ratio" 92*b* (step S121*c*), "failure coping time rate" 92*c* (step S121*d*) and "failure occurrence ratio" 92*d* represented by the sum total of "failure incurrence degree", "defective extraction ratio" and "failure coping time rate" (step S121*e*) and "room for improvement" 92*e* (step 121*g*), "ideal workshop failure occurrence ratio" 93*a* and "worst workshop failure occurrence ratio" 93*b* (step S121*f*) by executing a workshop evaluating computation program stored in the workshop evaluation-dedicated storage area 4*a*, whereon the information thus derived is stored temporarily in the RAM 33. In this conjunction, the information "ideal workshop failure occurrence ratio" 93*a* indicates the failure occurrence ratio e.g. for the workshop facility level "1" (highest level). On the other hand, the information "worst workshop failure occurrence ratio" 93*b* indicates the failure occurrence ratio e.g. for the workshop facility level "3" (lowest level). Further, the information "room for improvement" 92*e* can be indicated in terms of difference between "failure occurrence ratio" 92*d* and "ideal workshop failure occurrence ratio" 93*a*. By way of example, in the case where the evaluation category shown in FIG. 10 is "1", the workshop facility level is "2" with the inter-item relative weighing coefficient being "2". Consequently, the information "failure incurrence degree", "defective extraction ratio" and "failure coping time rate" are four times as large as the failure incurrence coefficient "3", the defective extraction ratio coefficient "1" and the failure coping time coefficient "2", respectively, wherein the failure occurrence ratio assumes "12", i.e., the sum total of the failure incurrence degree, the defective extraction ratio and the failure coping time rate. Since "ideal workshop failure occurrence ratio" is "12", "room for improvement" is "12".

Subsequently, the CPU 32 (workshop constant computing module 53 shown in FIG. 5) incorporated in the computer unit 3 arithmetically determines a cumulative total for all the workshop-conditioned failure influential items throughout all the failure incurrence factors (evaluation categories) in a step S121*h* to thereby determine arithmetically the total 98*a* of "failure incurrence degrees", the total 98*b* of "defective extraction degrees" and the total 98*c* of "failure coping time degrees" as well as the sum total 98 of the totals mentioned above, as can be seen in FIG. 10, the results of which are stored temporarily in the RAM 33 (step S121*i*). In succession, the CPU 32 of the computer unit 3 determines arithmetically the workshop-related fraction defective 99 on the basis of the sum total 98 of "failure incurrence degree", "defective extraction ratio" and "failure coping time rate" stored in the RAM 33, the result of which is stored at the workshop constant location of the work objective evaluating database 4*b*1 stored in the work objective evaluation-dedicated storage area 4*b* of the storage unit 4 (step S121*j*). In this manner, the real ability (the failure occurrence ratio sum total 98 and the workshop-related fraction defective 99) of the manufacturing workshop X under evaluation can be estimated to be stored at the workshop constant store location of the work objective evaluating database 4*b*1, as illustrated in FIG. 10.

At this juncture, it should be mentioned that every manufacturing workshop may be good at some manufacturing operation (e.g. attaching operation) while being poor at some other manufacturing operations. In order to reflect such aspect in the workshop evaluation, a plurality of workshop constant instead of a single workshop constant should preferably be set and stored at the workshop constant location of the work objective evaluating database 4b1. By way of example, in the case of a manufacturing work which can be classified or divided into several manufacturing operations (e.g. an attaching operation which can be classified into "press fitting", "soldering", "thread fastening" and others), the workshop constant should preferably be set separately for each of the manufacturing operations. In that case, it becomes necessary to evaluate by means of the workshop evaluating unit 10a the failure occurrence likelihood in the workshop for each of the manufacturing operations on the basis of the workshop-conditioned failure influential items corresponding to the manufacturing operations, respectively. Further, there also arises the necessity of fetching as the input the information concerning the species of the manufacturing operations for subclassifying the workshop as the manufacturing workshop conditions information Ia to be inputted for evaluation of the manufacturing workshop. Needless to say, for evaluation of the product or article, the subclassified manufacturing workshop name information or manufacturing operation species should be added as the workshop's name information 1b4 to be inputted. Furthermore, when workshop diagnosis data (category-based evaluation score 86 and category-based comment 87), workshop diagnosis data (point-by-point advice for improvement) and the like are to be outputted on the display device 2 in addition to the workshop-related fraction defective 99 as the result of the evaluation calculus for evaluation of the manufacturing workshop X in the form of, for example, a screen image 80 illustrated in FIG. 11 in a step S130, the CPU 32 of the computer unit 3 (category-based influence degree computing module 54a incorporated in a message control module 54 shown in FIG. 5) determines arithmetically the total of "failure incurrence degrees", total of "defective extraction ratios" and the total of "failure coping time rates" as well as the sum total thereof (failure occurrence ratio) in a step S122, whereon the evaluation score (fraction defective) conforming to the failure occurrence ratio as determined is then arithmetically determined to be stored, for example, in the storage unit 4. Subsequently, in a step S123, the CPU 32 selectively determines the workshop-conditioned failure influential item of a largest value from "room for improvement" 92e of the workshop-conditioned failure influential items belonging to the category for each of the evaluation categories, whereon the comment corresponding to the workshop-conditioned failure influential item as determined is retrieved from a workshop evaluating table 4b1 to be subsequently stored, for example, in the storage unit 4a and b. Additionally, in a step S124, the CPU 32 selects a plurality of workshop-conditioned failure influential items in the descending order of the values of "room for improvement" 92e, whereon the point-by-point advices for improvement are searched from the workshop evaluating table 4b1 on the basis of the selected workshop-conditioned failure influential items mentioned above and the workshop facility levels inputted for the workshop-conditioned failure influential items, respectively. In that case, the point-by-point advices for improvement are then stored, for example, in the storage unit 4. Consequently, the evaluation data resulting from the evaluation concerning the manufacturing workshop X is outputted in a step S130, making it possible to realize the improvement. In particular, by displaying the evaluation scores for every category with a circle graph, a line graph or the like, it is possible to grasp clearly at one glance what are influential.

As is apparent from the above, the data required among those resulting from the evaluating estimations concerning the manufacturing workshop X can be saved, being stored in the storage unit 4.

At this juncture, reference is made to FIG. 11 which shows an example of the screen image of the output of the workshop evaluating unit 10a according to the present invention. In the case of the example illustrated in FIG. 11, three types of evaluation data, i.e., (1) "workshop-related standard fraction defective estimation value" as the failure occurrence ratio data, (2) results of the workshop diagnosis data #1, and (3) results of the workshop diagnosis data #2 are outputted.

The "workshop-related standard fraction defective estimation value" (1) represents the fraction defective value estimated on an average in the case where the standard manufacturing works are conducted in the manufacturing workshops X under evaluation. Thus, comparison of the failure occurrence ratio can be performed among the manufacturing workshops.

Additionally, two species of workshop diagnosis results or data are acquired as the output data. Firstly, the workshop diagnosis data #1 represents the scores of evaluation concerning the workshop facility levels for every evaluation category. More specifically, on the presumption, for example, that the evaluation score of the ideal manufacturing workshop is "100" with that of the manufacturing workshop of the lowest level being "0", the score mentioned above indicates what score the total sum of the coefficient values for every category under evaluation in the evaluation-subjected manufacturing workshop X assumes between the values "100" and "0". Further, the workshop diagnosis result #2 represents the content of the point-by-point advice for improvement in the manufacturing workshop under evaluation. More specifically, the workshop diagnosis data #2 indicates as "workshop improvement point" the workshop-conditioned failure influential item for which the room for improvement is large, i.e., improvement of which can bring about significant effect of lowering the failure occurrence ratio and additionally indicates the coping measures plan selectively in terms of a short-term plan or a long-term plan, which can be realized by storing both the plans separately in the manufacturing workshop evaluating database 4a1 contained in the storage unit 4 and reading out separately the measures plan which can be effectuated within a short time period or the coping measures plan which has to be taken over an extended time period, both the plans being stored previously in the manufacturing workshop evaluating database.

Besides, the short-term measures plan and the long-term measures plan may separately be stored also for a, plurality of combinations of the workshop levels of plural workshop-conditioned failure influential items, as occasion requires.

Furthermore, display of the rooms for improvement in the descending order of the failure occurrence ratio lowering effects is preferred for implementing the measures right to the point with high efficiency, which can be realized by computing the rooms for improvement and sorting the results in the descending order for outputting. More specifically, difference is determined for each of the workshop-conditioned failure influential items between the failure occurrence ratio coefficient of the manufacturing workshop under evaluation and that of the ideal manufacturing workshop (i.e., the workshop of the level "1"), whereon the workshop-conditioned failure influential items are compared with one another to be thereby outputted in the descending order of magnitudes.

By virtue of processing procedure described above, there are made available the manufacturing workshop evaluation data with high reliability with simplified input operation. Further, since the manufacture workshop status items (i.e., points for improvement of the workshop) acquired as the result of evaluation are outputted in the descending order of magnitude of the rooms for improvement, the attempt for improving effectively the manufacturing workshop can be realized speedily.

In this way, by making use of the workshop evaluating unit 10a, the failure occurrence likelihood (real ability) of a given manufacturing workshop under evaluation can quantitatively be grasped without need for manufacturing actually articles or products in the given manufacturing workshop.

Further, because the workshop-conditioned failure influential items which exert remarkable influence to the failure occurrence in a given manufacturing workshop and improvement of the items, i.e., extent of reduction of the failure occurrence ratio realizable with appropriate measures, to say in another way, can quantitatively be grasped by a manufacturing center section, the present invention can help to plan a manufacturing workshop improving schedule for effective realization of improvement or enhancement of the workshop facility level and is thus effective for suppression of the failure occurrence. Furthermore, by virtue of the beforehand evaluation or pre-manufacture evaluation, the items or points important for management in the manufacturing workshop can distinctly be grasped in advance, and thus the inspection process arrangement and the inspection method which are right to the point can selectively be determined beforehand, which is very advantageous for the defective extraction as well. Besides, a design/development section can carry out effectively development and designing of a product or article in conformance to the status of the manufacturing workshop scheduled to engage in the manufacture of that article, because the failure occurrence ratio in that manufacturing workshop can be estimated in advance.

Next, description will be made in brief of an exemplary embodiment of the invention which is directed to estimation of the fraction defective of an article or product to be manufactured (e.g. assembled) in a given manufacturing workshop with the product evaluating unit 10b on the basis of the workshop-related fraction defective 99 of that manufacturing workshop the fraction defective being stored in the workshop constant area of the work objective evaluating database 4b1 as described hereinbefore.

In the description which follows, the work of manufacturing an article or product is assumed to be an assembling work.

It is still further to be mentioned that information concerning the component part ID numbers, materials, weights, unit price and the like information is supplied from the design system 20.

Figure 12:
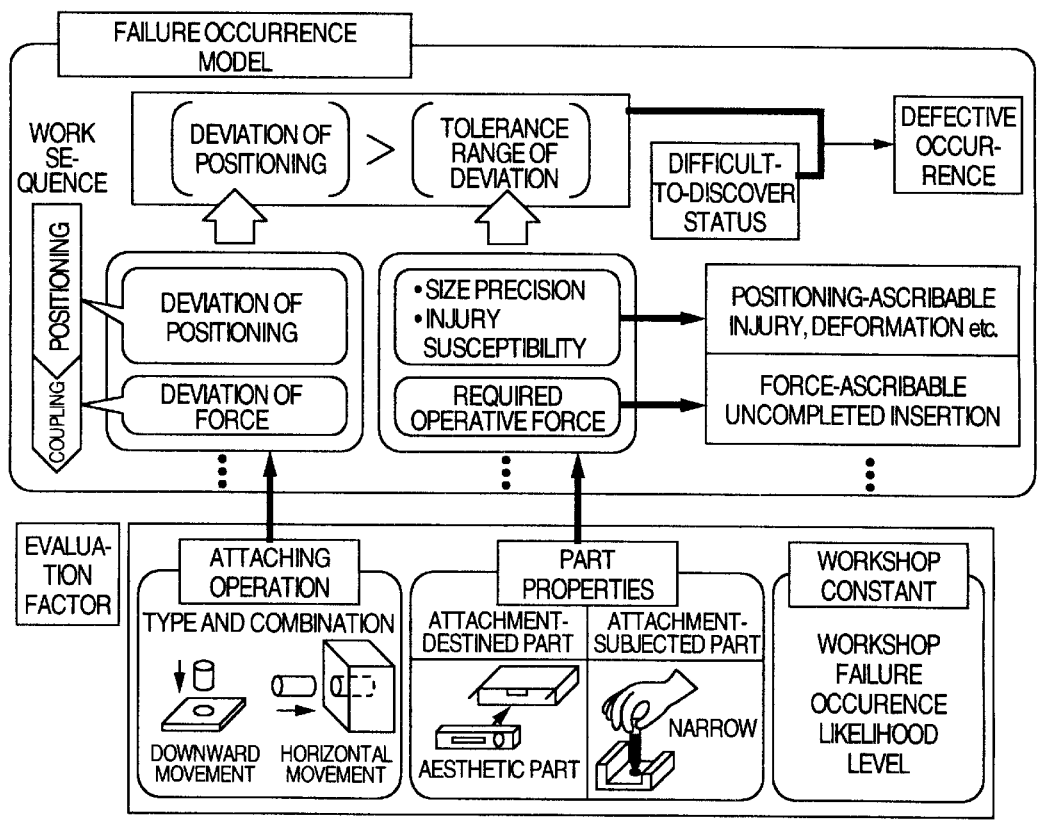
FIG. 12 is a view for illustrating a model of failure occurrence as brought about by part attaching operations according to the present invention.

FIG. 12 shows a defective occurrence model of a product which the present invention concerns. A sequence of assembling works includes "positioning operation" and "coupling operation" which follows the positioning operation. In other words, one assembling process is comprised of "positioning operation" and "coupling operation" succeeding thereto. As the occurrence of failure or defective, there can be conceived such a case in which "deviation of operation" exceeds "tolerance range of deviation" and in which no defect can be discovered or detected. In this conjunction, it will be safe to say that "deviation of operation" is determined by "deviation of positioning" which in turn is determined by attaching operation and properties of component parts and "deviation of force" which makes appearance upon "coupling operation".

The "tolerance range of operation deviation" is determined by "dimensional precision or precision of size", injury susceptibility, etc." which in turn is determined upon "positioning operation" in dependence on the properties of component parts and "required operative force" for "coupling operation" and the like. The failure occurrence which is ascribable to "positioning" can be exemplified by injury-ascribable deformation, while as the failure occurrence ascribable to "force", there can be mentioned incomplete insertion or placement.

As is apparent from the above, it can be regarded that one assembling work is basically represented by repetition of "positioning operation" and "succeeding coupling operation". Some of the standard attaching operations can be completed through only one process "positioning operation" such as operation for holding a component part or operation for forming an electric wire. However, most of attaching operations are each realized ordinarily by "positioning operation" and "coupling operation" which succeeds to the former.

As can be now appreciated, the standard attaching operation is comprised of "positioning operation" and "coupling operation", and thus the work failures can roughly be classified into two types, i.e., work failure occurring upon positioning operation and work failure occurring upon coupling operation. Firstly, the failure occurring in the positioning operation is ascribable to deviation (inaccuracy) of the positions or postures of component parts in the positioning operation. Upon transition to the actual coupling operation with inadequate positioning, not only such a failure may occur that the actual coupling operation is rendered impossible (work-uncompleted failure) but also such situation may be incurred that an interconnecting portion between an attachment-destined part, i.e., a part to be attached and an attachment-subjected part, i.e., a part to which the attachment-destined part is attached, is injured or deformed in dependence on the strength of such interconnected portion and the operative force.

Ordinarily, a worker makes transition to the coupling operation after having confirmed that the positioning operation has been completed satisfactorily. If the positioning is inadequate, he or she will correct the positioning before starting the actual coupling operation. However, when it is difficult to confirm the positioning due to less-visibility of the relevant portion or when confirmation of the positioning is neglected unintentionally, the failures such as mentioned above are likely to occur.

Furthermore, the assembling failures ascribable to the coupling operation can be classified into failures due to a path control failure in the course of the coupling operation, i.e., deviation or inaccuracy of a path along which the part is moved for attachment and failures attributable to insufficiency of the operative force. The assembling failure due to the path control failure in the course of coupling operation is likely to occur particularly when the component part acts over a long span. On the other hand, the assembling failure attributable to insufficiency of the operative effort or force in the coupling operation will occur when the operative force required for the attachment work can not be applied. By way of example, when a large magnitude of the operative force is demanded as in the case of insertion under pressure or press fitting operation, the assembling failure is likely to occur at a high frequency if the operative force of a predetermined magnitude can not be applied due to restriction imposed in view of the nature of the operation, the properties of the component parts or the like.

As can be appreciated from the above, since the assembling work of an article or product and a subassembly to be subjected to the evaluation includes a plurality of assembling works for assembling sequentially a plurality of component parts, the assembling work can be represented by a combination of predetermined plural standard attaching operations (e.g. downward movement, horizontal movement, inversion, press fitting, soldering, thread fastening, shaping and the like). Accordingly, the failure occurrence likelihood (fraction defective) in the assembling work of an article or a subassembly under evaluation can arithmetically be determined by synthesizing the fraction defective coefficients of the standard attaching operations, respectively. Thus, the accuracy for the estimation of likelihood of the assembling failure (fraction defective) in the assembling work of an article and a subassembly under evaluation can be enhanced by correcting supplementarily the fraction defective coefficients of the individual standard attaching operations by taking into account the number of attaching operations involved in completing a given assembling work, properties conditions (e.g. functions (part species such as exemplified by aesthetic part and the like) of attachment-destined parts and attachment-subjected parts, sizes, weights and shapes (e.g. smallness or fineness of component parts, and attitudes or orientations of plural component parts (simultaneous multipoint aligning) upon attaching operation as the attachment-destined part conditions, while taking into account as the attachment-subjected part conditions fine holes/small holes, number of locations for positional alignment, space surrounding an attachment section, absence of positioning guides, attachment to movable parts, etc), dimensional precision, surface precision, materials (presence of contact-insusceptible surface, especial materials), function) and others), conditions or statuses of assembling workshops (workshop constants), and the presence/absence of check process for confirming completion of attaching operation.

In other words, the objective under evaluation is expressed in terms of a combination of the standard attaching operations, and then the fraction defective coefficients which the individual standard attaching operations have, respectively, are corrected supplementarily in consideration of the number of the attaching operations, property-related conditions of the attachment-destined parts and the attachment-subjected parts, the conditions or statuses of the assembling workshop, and the presence/absence of the process for confirming the completion of attaching operation, whereon the values of the fraction defective coefficients resulting from the supplementation mentioned above are synthesized for thereby determining the fraction defective.

The reasons why the assembling-related fraction defective of the part attaching work is determined on the basis of the contents of operations involved in the attaching work, the properties of the attachment-destined parts and the attachment-subjected parts, presence/absence of the check process for confirming whether or not the work has been completed properly and the conditions or statuses of the workshop destined for performing the assembling works will be elucidated below.

Any attaching operation is naturally accompanied with the potential (assembling-related fraction defective coefficient) that can bring about occurrence of assembling failure, and it is the attaching operation among others which exerts a great influence to the likelihood of occurrence of failure or defect.

As the factors which can aggravate/migrate the assembling-related fraction defective coefficient of the attaching operation, there can be mentioned the properties of the attachment-destined part and the attachment-subjected part and the conditions or statuses of the workshop which is destined for carrying out the attaching works.

As to the properties of the attachment-destined part and the attachment-subjected part, the shapes or geometrical factors of the attachment-destined part and the attachment-subjected part may be mentioned, by way of example. In case the attachment-destined part and/or the attachment-subjected part is of such a shape which makes the attachment difficult, the assembling-related fraction defective coefficient of the attaching operation will be aggravated or increased. Further, for the reasons described below, such arrangement is adopted which allows the types or species of the parts (functions) to be inputted as the properties of the attachment-destined parts and the attachment-subjected parts.

The assembling failure may roughly be classified into two categories, i.e., assemblage imperfectness and injury/soil of the part. The "assemblage imperfectness" is primarily attributable to inaccurate operation (deviation of is the operation accuracy) and mistake of a worker. In the case of a connector inserting work which typifies the failure-susceptible assembling, "imperfect insertion (state in which the connector is not inserted to full depth)", "insertion of the connector in reversed orientation" and the like provide the factors for the assembling failure. On the other hand, "injury/soil of the part" may occur primarily as a result of deviation of operation (deviation of operation accuracy) and/or mistake of the worker. However, the part suffering "injury/soil" can not always be regarded as the defective but it depends on the type or species of the part regardless of "injury/soil" of same extent. By way of example, decorative parts which are exposed in outer appearance represent such type of part which may well be considered as defective in case there exists even a bit of injury and/or soil, differing from the parts disposed internally of the product or article. To say in another way, the parts undergone an external force (stress) of same magnitude cannot always be regarded as defective, but it depends on the part species or the functions imparted to the parts. For the reasons mentioned above, the coefficient values indicating strengths (withstanding capabilities) of the individual parts against external forces are stored in the database for each of the part species or types for thereby making it possible to input the part species or types of the attachment-destined parts and the attachment-subjected parts so that the estimated fraction defective can be arithmetically determined by taking into account the probability of the "injury/soil of part" defect by comparing the strength (withstanding capability) of a part under evaluation with magnitude of the external force (stress) acting on that part upon attaching operation thereof. In this manner, not only the defect due to "assemblage imperfectness" but also defect due to "injury/soil of the part" can be taken into account in the estimation of the fraction defective.

Similarly, the assembling-related fraction defective coefficient of the attaching operation is affected by the conditions or statuses of the workshop where the assembling work is performed. By way of example, when equipment employed for the work is likely to produce defectives, the fraction defective coefficient of the attaching operation will increase when compared with the case where the equipment which is unlikely to produce the detective is employed for a same attaching operation. Furthermore, when the workers engaged in an attaching work in a workshop have high skill as a whole, the fraction defective coefficient for the attaching operation tends to assume a smaller value when compared with the assembling shop where the workers are of low skill.

Additionally, by providing as the failure or defective detecting potential a check process for confirming whether or not a given attaching work has been completed satisfactorily in succession to an attaching work process for an objective to be evaluated concerning the assembling-related fraction defective, occurrence of failure or defect can be detected in the check process, whereon appropriate measures for coping with the defect can be taken. Thus, the probability of becoming finally defective can be lowered. For the reasons described above, the product evaluating unit 10b is so designed that the fraction defective is arithmetically determined or computed on the basis of the contents of operations involved in the attaching work, the properties of the attachment-destined part(s) and the attachment-subjected part(s), the presence or absence of the check process for confirming whether the work has been completed properly, and the conditions or statuses of the workshop where the attaching work is performed, since these factors exert significant influence to the assembling-related failure.

Such being the circumstances, in the product structure evaluation-dedicated storage area 4b of the storage unit 4, there are stored the product structure evaluating database 4b1 which stores therein standard-attaching operation-based fraction defective coefficients corresponding to the sorts or types of standard attaching operations (part attaching operations), operation-sequence-related supplementing coefficients corresponding to the number of attaching operations which are required for completing a given assembling work (referred to as the attachments number), attachment-destined-part-condition/attachment-subjected-part-condition-related supplementing coefficients corresponding to properties of the attachment-destined parts and the attachment-subjected parts, check-process-related supplementing coefficient in the case where the process or step of confirming the attachment completeness in succession to the attaching work, and workshop constants corresponding to the conditions or statuses of the assembling workshops where the assembling work is performed, a store area 4b2 for storing a product structure evaluating computation program including arithmetic expressions for executing the fraction defective determining arithmetics in the product evaluating unit now under consideration, and an area 4b3 for storing a product structure evaluation-dedicated input/output control program and others. The coefficients stored in the product structure evaluating database 4b1 are preset on the basis of the real assembling failure occurrence data so that they assume large values or alternatively small values for the items for which the failure or defect is more likely to occur.

On the conditions described above, an input image is first displaced on the display device 2, whereon the information (species of operations and sequence of operations) 1b1 concerning the attaching operations in the component part attaching work, the property information concerning the properties of the attachment-destined parts and the attachment-subjected parts (information concerning the factors exerting influence to the uncertainty of the attaching operations) 1b2, the check process presence/absence information 1b3, and information 1b4 concerning the names or identifiers of manufacturing workshops destined for performing the attaching works, as illustrated in FIG. 3, are inputted in correspondence to the attaching operations, respectively, by resorting to the use of the input device 1 to be subsequently stored in the RAM 33 temporarily.

In succession, the CPU 32 (extracting modules 131a to 131c incorporated in the discriminative decision module 131 shown in FIG. 13) extracts the fraction defective coefficients corresponding to the inputted standard attaching operation elements, respectively, from the standard-attaching-operation-based fraction defective coefficients stored in the database 4b1, extracts the supplementing coefficients corresponding to the umber of attachments (sequence of the standard attaching operations), respectively, for the inputted standard attaching operations from the operation-sequence-related supplementing coefficients stored in the product structure evaluating database 4b1, extracts the supplementing coefficients corresponding to the inputted properties information of the attachment-destined parts and the attachment-subjected parts for the standard attaching operations, respectively, from the attachment-destined-part condition/attachment-subjected-part-condition-related supplementing coefficients stored in the database 4b1, extracts the inputted supplementing coefficients corresponding to the presence/absence of the check process for the standard attaching operations, respectively, from the check process-related supplementing coefficients stored in the database 4b1, and extracts the supplementing coefficient corresponding to the inputted name of the manufacturing workshop where a series of standard attaching operations are carried out from the workshop constants stored in the database 4b1, wherein the extracted information mentioned above are temporarily stored in the RAM 33.

Subsequently, the CPU 32 (product-structure-related fraction defective computing module 132 shown in FIG. 13) determines arithmetically the product-assembling-related fraction defective estimated value by cumulatively computing the fraction defective estimated value for each of the part attaching operation on the basis of the assembling failure estimating formula (Equation 2) mentioned below which in turn is based on the relation represented by the undermentioned expression (Equation 1) in accordance with product structure evaluating computation program stored in the area 4b2.

Estimated value of assembling-related fraction defective of a product $$=\Sigma f1(\text{contents of attaching operation, attachments number, properties of component parts, conditions/statuses of workshop and presence/absence of check process}) \quad \ldots (\text{Eq. 1}),$$

$$=\Sigma f2(\text{attaching-operation-based fraction defective coefficients, operation-sequence-related supplementing coefficients, part-related supplementing coefficients, workshop-related supplementing coefficients, check-process-related supplementing coefficients}) \quad (\text{Eq. 2}),$$

where f1( ) and f2( ) represent functions, respectively. For implementing these functions, various methods may be resorted to such as, for example, multiplication of the attaching-operation-based fraction defective coefficients by the operation-sequence-related supplementing coefficients, part-related supplementing coefficients, workshop-related supplementing coefficients, check-process-related supplementing coefficients or method of adding/subtracting these coefficients or exponentially supplementing method.

Furthermore, as the supplementation methods for the case where pluralities of operation-sequence-related supplementing coefficients, part-related supplementing coefficients, workshop-related supplementing coefficients, respectively, and check-process-related supplementing coefficients are available for a single attaching operation, there may be adopted a method of multiplying the attaching-operation-based fraction defective coefficient relevant to the attaching operation of concern by all the operation-sequence-related supplementing coefficients, the part-related supplementing coefficients, the workshop-related supplementing coefficients and the check-process-related supplementing coefficients, a method of adding (or subtracting) all of the operation-sequence-related supplementing to coefficients, the part-related supplementing coefficients, the workshop-related supplementing coefficients and the check-process-related supplementing coefficients to (or from) the attaching-operation-based fraction defective coefficient of the attaching operation of concern.

For carrying out the present invention, there may be selected any one of the procedures mentioned above so long as the attaching-operation-based fraction defective coefficient can be supplementarily corrected, i.e., supplemented with the operation-sequence-related supplementing coefficient, the part-related supplementing coefficient, the workshop-related supplementing coefficient and the check-process-related supplementing coefficient.

At this juncture, it should be mentioned that the operation-sequence-related supplementing coefficient stored in the database $4b1$ is to serve as the supplementing coefficient for increasing "attaching-operation-based fraction defective basic coefficient" of the individual attaching operations constituting an attaching work in accordance with the sequence of the attaching operations because in the case of the attaching work expressed by a plurality of standard attaching operation elements, the work involved becomes increasingly complicated as the number of operations involved increases. Furthermore, since the work failure occurrence likelihood due to each attaching operation is affected by the conditions or statuses of the attachment-destined part and the attachment-subjected part as well as the surrounding conditions, there is provided the part-condition or status-related supplementing coefficient. More specifically, the work failure occurrence likelihood due to each attaching operation can vary in dependence on the properties and the conditions or statuses of the properties of the attachment-destined part such as the size, the weight, the material, the number of locations requiring positional alignment and the like. Similarly, the work failure occurrence likelihood due to each attaching operation changes in dependence on the properties and the conditions or statuses of the attachment-subjected part. In view of the above, the attachment-destined-part-condition-related supplementing coefficient database and the attachment-subjected-part-condition-related supplementing coefficient database constituting parts of the database $4b1$ set therein attachment-destined part property factors and attachment-subjected part property factor which exert significant influence to the work failure occurrence likelihood due to each of the attaching operations, to thereby make available the part-condition-related supplementing coefficient for supplementing the standard-attaching-operation-based fraction defective coefficient on a factor-by-factor basis. Incidentally, the attachment-destined-part-condition-related supplementing coefficient database and the supplementing coefficient database may be implemented in mutually different database structures, respectively.

Furthermore, since the work failure occurrence likelihood due to the individual attaching operations varies significantly in dependence on the conditions or statuses of the manufacturing workshop destined for carrying out the assembling work, the workshop constants each indicative of a mean failure occurrence likelihood of the manufacturing workshop (index of the real ability of the manufacturing workshop) for the standard assembling work standard manufacturing work) such as exemplified by "downward movement" evaluated and estimated by the workshop evaluating unit $10a$ are stored in the database $4b1$. In this conjunction, it should be mentioned that although the workshop constant indicates the mean failure occurrence likelihood in the manufacturing workshop (index of the real ability of the manufacturing workshop), it is not always necessary to define only one workshop constant. In other words, a series of attaching operations may be classified into a plurality of attaching operations, and the workshop constants for a plurality of attaching operations resulting from the classification may be evaluated by the workshop evaluating unit $10a$ to be subsequently stored in the database $4b1$. In other words, the workshop supplementing coefficient representing the workshop constant making appearance in the aforementioned expression (Eq. 2) can be changed in dependence on every set of plural attaching operations. Further, when the part attaching work which is subjected to the assembling-related fraction defective estimation is followed by the process for checking whether or not the relevant part attaching work has been carried out properly, the fraction defective can be lowered. The check-process-related supplementing coefficient mentioned previously serves as the supplementing coefficient for reflecting the fraction defective lowering effect of the checking process. In this conjunction, it is noted that the defective extraction ratio varies in dependence on the types or contents of the check work. In that case, the check-process-related supplementing coefficient may be set in dependence on the different contents of the check process. Incidentally, the information $1b3$ concerning the presence/absence of the check process is not necessarily required. The fraction defective as desired can equally be arithmetically determined even when the information mentioned above is unavailable.

Although the foregoing description directed to the estimation and evaluation of the fraction defective of the product has been made on the presumption that the attachment-destined part itself suffers no defect. However, in practice, there may exist the attachment-destined parts which suffer defects. In other words, the fraction defective may also be found in the attachment-destined parts themselves. Accordingly, by taking into account the fraction defective of the attachment-destined parts themselves, it is possible to determine arithmetically the true fraction defective of the products. In view of the fact that the fractions defectives of the attachment-destined parts themselves are managed by another workshop or a manufacturer who is in charge of manufacturing the attachment-destined parts, the supplementing coefficient based on the fraction defective of the attachment-destined parts themselves is determined arithmetically through similar procedure adopted in evaluation of the manufacturing workshop, whereon the supplementing coefficients as determined may be stored in the product structure evaluating database $4b1$ in correspondence- to the names of the attachment-destined parts, respectively.

Next, description will be directed to the failure event estimating module (CPU 32) 133 incorporated in the product evaluating unit $10b$. The product-structure-related fraction defective computing module 132 is designed to determine arithmetically the sum of the fraction defective coefficients or fractions defectives corrected supplementarily in consideration of the relevant attaching operations, respectively. The failure event estimating module 133 may be so designed as to select, by way of example, a plurality of fraction defective coefficients or fractions defectives sequentially from a group of the attaching-operation-based fraction defective coefficients or fractions defectives totalized as mentioned above in a descending order, starting from the largest one, to thereby determine selectively the attaching operation which can be estimated as bringing about the failure events most frequently. Besides, the failure event estimating module 133 can be so arranged as to follow out whether the failure event of concern is ascribable to "positioning operation" or "coupling operation" by searching the fraction defective coefficients, the operation-sequence-related supplementing coefficients, the part-related supplementing coefficients or the like take part in determination of the totalized attaching operation-based fraction defective coefficients.

Next, description will turn to the manufacturing cost computing module (CPU 32) 134 incorporated in the product evaluating unit 10b and comprised of an assembling cost computing module 134a, an assembling-failure-ascribable loss cost computing module 134b and a total cost computing module 134c. The unit prices of the attachment-destined parts are supplied from the design system and stored in the product structure evaluating database 4b1. Further stored in the product structure evaluating database 4b1 are the work time demanded for each species of standard attaching operations, work time supplementing coefficients which correspond to the supplementing coefficients for the attachment-destined part status, the attachment-subjected part status, operation sequences, the check process presence/absence status, respectively, and the costs per unit work time corresponding to the manufacturing workshop constants, respectively. Thus, the assembling cost computing module 134a can arithmetically estimate the assembling costs on the basis of the standard-attaching-operation-based work time, the work time supplementing coefficients and the costs per unit work time which correspond to the manufacturing workshop constants, respectively. Furthermore, since the fraction defective of the products on the whole and the totalized standard-attaching-operation-based fraction defective can be computed, the assembling-failure-ascribable loss cost computing module 134b is also capable of estimating the work time taken for disassembling the product in order to replace a defective attached part by an attachment-destined part of good quality on the basis of the data which are used for computing the assembling cost. In that case, there will arise the necessity of taking into account the unit price of the attachment-destined part of good quality and the cost involved in discarding the defective attachment-destined part. Besides, in case the defective attachment-destined part is processed to be recycled as an attachment-destined part of good quality, the cost involved in such repair process may also have to be taken into account.

As is apparent from the above, the total cost computing module 134c is capable of computing the manufacturing cost of a product or assemblies of product by summing up the totalized assembling cost computed by the assembling cost computing module 134a, the total loss cost ascribable to the assembling failure as computed by the assembling-failure-ascribable loss cost computing module 134b and the sum total of the unit prices of the attachment-destined parts.

As can be understood from the foregoing description, the fractions defectives of the products or the subassemblies estimated by the product-structure-related fraction defective computing module 132, the failure events or phenomena estimated by the failure event estimating module 133, the manufacturing costs of the products or subassemblies estimated by the manufacturing cost computing module 134 can be outputted to the display device 2 or the output unit 5 together with the names or identifiers of the products or the subassemblies.

In the foregoing description, it has been presumed that the fraction defective of the product or subassembly is estimated in conjunction with the assembling work. However, estimation of the fraction defective can equally be realized in the case of processing works as well. In the case of the processing work, the phrase "standard-attaching-operation-based" should be replaced by the phrase "subclassified standard-processing-operation-based" while the phrase "conditions or statuses of the attachment-destined parts and the attachment-subjected parts" should be read as the conditions or statuses (properties) of processing means and processing-subjected parts with the attaching operation sequence being replaced by processing operation sequence.

With the evaluation apparatus according to the invention described above, it is possible to evaluate a production process or processes in a given factory by examining or testing the factory at a quality securing department. Thus, the evaluation apparatus can be used effectively for making decision as to whether a given factory can fulfill required qualification or for presenting guidelines for quality improvement, advantageously to the quality enhancement.

Moreover, with the evaluation apparatus 10 according to the present invention, departments for design/manufacture/quality management are imparted with the faculty for conducting accurately and aptly the activities for preventing occurrence of defectives and removing the defectives.

Thus, by making use of the evaluation apparatus 10 according to the present invention in the course of the product developing/manufacturing processes, the defectives occurring in the manufacturing process as well as the defectives making appearance on-the market can be reduced remarkably, as a result of which the reliability of the products for shipping can be enhanced significantly.

According to the teachings of the present invention, it is possible to evaluate or estimate the likelihood of occurrence of failures/defectives of products/articles in manufacturing workshops (inclusive of a factory) where the products/articles are scheduled to be manufactured through assembling or processing processes at a stage which precedes to manufacturing such as a design stage, manufacturing process planning stage or the like, whereby the quality such as the work-ascribable fraction defective of the products/articles manufactured through a series of manufacturing works in the workshop(s) can be estimated/evaluated with a high accuracy, and thus the defective occurrence prevention/defective extraction activities can be conducted rightly to the point in the design/manufacture/quality securing departments, to the advantageous effect that the reliability of the products for shipment can be enhanced drastically.

Furthermore, according to the teachings of the present invention, the estimated values of the fractions defectives of given products can be deduced with high accuracy on a manufacturing work basis in precedence to the actual manufacturing of these products, e.g., at a product design stage, manufacturing process planning stage or the like, enabling thus the manufacturing works of large fraction defective coefficients to be extracted or identified discriminatively without any appreciable difficulty, as a result of which the fractions defectives of the products can be reduced efficiently and effectively by taking measures for improving the manufacturing works. Thus, products designing and manufacturing can be realized with enhanced reliability. Further, according to the teachings of the present invention, it is possible to evaluate or estimate with high accuracy the likelihood of occurrence of defects of products in a manufacturing workshop (inclusive of a factory) where the products are scheduled to be manufactured through assembling processes at a time point preceding to the manufacturing such as at a design stage, manufacturing-process planning stage or the like. Thus, improvement of the manufacturing workshop can be implemented in advance, to advantageous effect.

What is claimed is:

1. A method of evaluating a failure occurrence likelihood of a manufacturing workshop, comprising:

a workshop database preparation step of creating previously a workshop evaluating database to be stored for preparation, said workshop evaluating database indicating correspondence relations between a plurality of workshop-conditioned failure influential items set previously and failure occurrence ratio indexes at least for standard manufacturing works at standard workshop facility levels for said workshop-conditioned failure influential items, respectively;

a step of extracting from said workshop evaluating database prepared in said workshop database preparation step those failure occurrence ratio indexes which correspond to workshop facility levels of an inputted evaluation-undergoing manufacturing workshop for the workshop-conditioned failure influential items, respectively; and a workshop evaluation step of evaluating through estimation the failure occurrence likelihood in said evaluation-undergoing manufacturing workshop by totalizing the extracted failure occurrence ratio indexes for a plurality of concerned workshop-conditioned failure influential items to thereby determine arithmetically the indexes indicating the failure occurrence ratios for the standard manufacturing works, respectively, in said evaluation-undergoing manufacturing workshop.

2. A method of evaluating a-failure occurrence likelihood of a manufacturing workshop, comprising:

a workshop database preparation step of creating previously a workshop evaluating database to be stored for preparation, said workshop evaluating database indicating correspondence relations between a plurality of workshop-conditioned failure influential items set previously and failure occurrence ratio indexes at least for standard manufacturing works at standard workshop facility levels for said workshop-conditioned failure influential items, respectively;

a workshop facility level inputting step of inputting at least workshop facility levels of an evaluation-undergoing manufacturing workshop for the workshop-conditioned failure influential items, respectively;

a step of extracting from said workshop evaluating database prepared in said workshop database preparation step said failure occurrence ratio indexes which correspond to the workshop facility levels, respectively, inputted in said workshop facility level inputting step for said workshop-conditioned failure influential items; and a workshop evaluation step of evaluating through estimation the failure occurrence likelihood in said evaluation-undergoing manufacturing workshop by totalizing the extracted failure occurrence ratio indexes for a plurality of concerned workshop-conditioned failure influential items to thereby determine arithmetically the indexes indicating the failure occurrence ratios for the standard manufacturing works in said evaluation-undergoing manufacturing workshop.

3. A method of evaluating a failure occurrence likelihood of a manufacturing workshop, comprising:

a workshop database preparation step of creating previously a workshop evaluating database to be stored for preparation, said workshop evaluating database indicating correspondence relations between workshop-conditioned failure influential items set previously concerning worker(s), manufacturing equipment, manufacturing conditions, physical environment for manufacturing and management on one hand and on the other hand failure incurrence indexes representing failure occurrence suppressing abilities, failure coping time rate indexes representing failure occurrence coping abilities and defective extraction indexes representing failure detecting abilities at least for standard manufacturing works, respectively, at standard workshop facility levels for said workshop-conditioned failure influential items, respectively;

a workshop facility level inputting step of inputting at least workshop facility levels of an evaluation-undergoing manufacturing workshop for said workshop-conditioned failure influential items, respectively;

a step of extracting from said workshop evaluating database prepared in said workshop database preparation step said failure occurrence, failure coping time rate, and defective extraction indexes which correspond to the workshop facility levels, respectively, inputted in said workshop facility level inputting step for said workshop-conditioned failure influential items; and a workshop evaluation step of evaluating through estimation the failure occurrence likelihood in said evaluation-undergoing manufacturing workshop by totalizing said failure occurrence, failure coping time rate, and defective extraction indexes over a plurality of concerned workshop-conditioned failure influential items to thereby determine arithmetically the indexes indicating the failure occurrence ratios for the standard manufacturing works in said evaluation-undergoing manufacturing workshop.

4. A method of evaluating a failure occurrence likelihood of a manufacturing workshop, comprising:

a workshop database preparation step of creating previously a workshop evaluating database to be stored for preparation, said workshop evaluating database indicating correspondence relations between workshop-conditioned failure influential items set previously concerning worker(s), manufacturing equipment, manufacturing conditions, physical environment for manufacturing and management on one hand and on the other hand failure incurrence indexes representing failure occurrence suppressing abilities, failure coping time rate indexes representing failure occurrence coping abilities and defective extraction indexes representing failure detecting abilities for standard manufacturing works, respectively, at least at standard workshop facility levels for said workshop-conditioned failure influential items, respectively;

a workshop facility level inputting step of inputting at least workshop facility levels of an evaluation-undergoing manufacturing workshop for the workshop-conditioned failure influential items, respectively;

a step of extracting from said workshop evaluating database prepared in said workshop database preparation step said failure occurrence, failure coping time rate, and defective extraction indexes which correspond to the workshop facility levels, respectively, inputted in said workshop facility level inputting step for said workshop-conditioned failure influential items and totalizing said failure occurrence, failure coping time rate, and defective extraction indexes to thereby arithmetically determine indexes indicating failure occurrence ratios for said workshop-conditioned failure influential items, respectively; and a workshop evaluation step of evaluating through estimation the failure occurrence likelihood in said evaluation-undergoing manufacturing workshop by totalizing said arithmetically determined indexes indicating the failure occurrence ratios over a plurality of concerned workshop-conditioned failure influential items to thereby determine arithmetically the indexes indicating the failure occurrence ratios for the standard manufacturing works, respectively, in said evaluation-undergoing manufacturing workshop.

5. A method of evaluating a failure occurrence likelihood of a manufacturing workshop, comprising:

a workshop database preparation step of creating previously a workshop evaluating database to be stored for preparation, said workshop evaluating database indicating correspondence relations between a plurality of workshop-conditioned failure influential items set previously and failure occurrence ratio indexes at least for standard manufacturing works at standard workshop facility levels for said workshop-conditioned failure influential items, respectively:

a step of extracting from said workshop evaluating database prepared in said workshop database Preparation step those failure occurrence ratio indexes which correspond to workshop facility levels of an inputted evaluation-undergoing manufacturing workshop for the workshop-conditioned failure influential items, respectively; and a workshop evaluation step of evaluating through estimation the failure occurrence likelihood in said evaluation-undergoing manufacturing workshop by totalizing the extracted failure occurrence ratio indexes for a plurality of concerned workshop-conditioned failure influential items to thereby determine arithmetically the indexes indicating the failure occurrence ratios for the standard manufacturing works, respectively, in said evaluation-undergoing manufacturing workshop, wherein in said workshop evaluation step, said workshop-conditioned failure influential items are mutually imparted with relative weights.

6. A method of evaluating a failure occurrence likelihood of a manufacturing workshop in comprising:

a workshop database preparation step of creating previously a workshop evaluating database to be stored for preparation, said workshop evaluating database indicating correspondence relations between workshop-conditioned failure influential items set previously concerning worker(s), manufacturing equipment, manufacturing conditions, physical environment for manufacturing and management on one hand and on the other hand failure incurrence indexes representing failure occurrence suppressing abilities, failure coping time rate indexes representing failure occurrence coping abilities and defective extraction indexes representing failure detecting abilities at least for standard manufacturing works, respectively, at standard workshop facility levels for said workshop-conditioned failure influential items, respectively;

a workshop facility level inputting step of inputting at least workshop facility levels of an evaluation-undergoing manufacturing workshop for said workshop-conditioned failure influential items, respectively;

a step of extracting from said workshop evaluating database Prepared in said workshop database preparation step said failure occurrence, failure coping time rate, and defective extraction indexes which correspond to the workshop facility levels, respectively, inputted in said workshop facility level inputting step for said workshop-conditioned failure influential items; and a workshop evaluation step of evaluating through estimation the failure occurrence likelihood in said evaluation-undergoing manufacturing workshop by totalizing said failure occurrence, failure coping time rate, and defective extraction indexes over a plurality of concerned workshop-conditioned failure influential items to thereby determine arithmetically the indexes indicating failure occurrence ratios for the standard manufacturing works in said evaluation-undergoing manufacturing workshop, wherein in said workshop database preparation step, the workshop-conditioned failure influential items concerning the worker(s), the manufacturing equipment, the manufacturing conditions, the physical environment for manufacturing and the management are each subclassified into a plurality of items for each of said worker(s), the manufacturing equipment, the manufacturing condition, the physical environment for manufacturing and the management.

7. A method of evaluating a failure occurrence likelihood of a manufacturing workshop comprising:

a workshop database preparation step of creating previously a workshop evaluating database to be stored for preparation, said workshop evaluating database indicating correspondence relations between workshop-conditioned failure influential items set previously concerning worker(s), manufacturing equipment, manufacturing conditions, physical environment for manufacturing and management on one hand and on the other hand failure incurrence indexes representing failure occurrence suppressing abilities, failure coping time rate indexes representing failure occurrence coping abilities and defective extraction indexes representing failure detecting abilities at least for standard manufacturing works, respectively, at standard workshop facility levels for said workshop-conditioned failure influential items, respectively;

a workshop facility level inputting step of inputting at least workshop facility levels of an evaluation-undergoing manufacturing workshop for said workshop-conditioned failure influential items, respectively;

a step of extracting from said workshop evaluating database prepared in said workshop database preparation step said failure occurrence, failure coping time rate, and defective extraction indexes which correspond to the workshop facility levels, respectively, inputted in said workshop facility level inputting step for said workshop-conditioned failure influential items;

a workshop evaluation step of evaluating through estimation the failure occurrence likelihood in said evaluation-undergoing manufacturing workshop by totalizing said failure occurrence, failure coping time rate, and defective extraction indexes over a plurality of concerned workshop-conditioned failure influential items to thereby determine arithmetically the indexes indicating failure occurrence ratios for the standard manufacturing works in said evaluation-undergoing manufacturing workshop;

an output step of outputting results of evaluation as executed by said workshop evaluation step.

8. A method of evaluating a quality of a product, comprising:

a workshop database preparation step of creating previously a workshop evaluating database to be stored for preparation, said workshop evaluating database indicating correspondence relations between a plurality of workshop-conditioned failure influential items set previously and failure occurrence ratio indexes at least for standard manufacturing works at standard workshop facility levels for said workshop-conditioned failure influential items, respectively;

a step of extracting from said workshop evaluating database prepared in said workshop database preparation step those failure occurrence ratio indexes which correspond to workshop facility levels of an inputted manufacturing workshop for the workshop-conditioned failure influential items, respectively;

a workshop evaluation step of evaluating and estimating the failure occurrence likelihood in the manufacturing workshop by totalizing the extracted failure occurrence ratio indexes over a plurality of concerned workshop-conditioned failure influential items to thereby determine arithmetically the indexes indicating the failure occurrence ratios for the standard manufacturing works, respectively, in said manufacturing workshop, results of said evaluation and estimation being stored as a workshop index in a product/article evaluating database; and a product evaluating step of evaluating a quality indicating a work-related defective ratio of a product manufactured through a plurality of manufacturing works in said manufacturing workshop by using the workshop index concerning said manufacturing workshop as stored in the product/article evaluating database in said workshop evaluation step.

9. A method of evaluating quality of a product, comprising:

a workshop database preparation step of creating previously a workshop evaluating database to be stored for preparation, said workshop evaluating database indicating correspondence relations between a plurality of workshop-conditioned failure influential items set previously and failure occurrence ratio indexes at least for standard manufacturing works at standard workshop facility levels for said workshop-conditioned failure influential items, respectively;

a step of extracting from said workshop evaluating database prepared in said workshop database preparation step those failure occurrence ratio indexes which correspond to workshop facility levels of an inputted manufacturing workshop for the workshop-conditioned failure influential items, respectively;

a workshop evaluation step of evaluating and estimating failure occurrence likelihood in the manufacturing workshop by totalizing the extracted failure occurrence ratio indexes over a plurality of concerned workshop-conditioned failure influential items to thereby determine arithmetically the indexes indicating the failure occurrence ratios for the standard manufacturing works, respectively, in said manufacturing workshop, results of said evaluation and estimation being stored as a workshop index in a product/article evaluating database;

a product evaluating step of evaluating a quality indicating a work-related defective ratio of a product manufactured through a plurality of manufacturing works in said manufacturing workshop by using the workshop index concerning said manufacturing workshop as stored in the product/article evaluating database in said workshop evaluation step; and a product database preparation step of storing in advance for preparation in a product evaluating database indexes indicating fractions defectives in a plurality of mutually differing standard manufacturing operations, respectively, and supplementary indexes which are based on properties of component parts involved in the standard manufacturing operations, respectively;

a product input step of inputting standard manufacturing operations inclusive of properties of the component parts involved in individual manufacturing works, respectively, over a plurality of manufacturing works for manufacturing a product;

a step of extracting the indexes indicating the fractions defectives and the supplementary indexes from the product evaluating database prepared in said product database preparation step on the basis of the standard manufacturing operations inclusive of the properties of the component parts in the individual manufacturing works as inputted in said product input step, said extracting step being executed in said product evaluating step; and an evaluation/estimation step of correcting supplementarily the indexes indicative of the fractions defectives extracted in said indexes extracting step with said extracted supplementary indexes and synthesizing said supplementarily corrected indexes indicating the fractions defectives throughout a plurality of manufacturing works, whereon the synthesized index indicative of the fraction defective is supplementarily corrected with the workshop index stored in said workshop evaluation step for thereby evaluating through estimation the quality of said product indicative of the work-related defective ratio.

10. A method of evaluating quality of a product, comprising:

a workshop database preparation step of creating previously a workshop evaluating database to be stored for preparation, said workshop evaluating database indicating correspondence relations between a plurality of workshop-conditioned failure influential items set previously and failure occurrence ratio indexes at least for standard manufacturing works at standard workshop facility levels for said workshop-conditioned failure influential items, respectively;

a step of extracting from said workshop evaluating database prepared in said workshop database preparation step those failure occurrence ratio indexes which correspond to workshop facility levels of an inputted manufacturing workshop for the workshop-conditioned failure influential items, respectively;

a workshop evaluation step of evaluating and estimating failure occurrence likelihood in the manufacturing workshop by totalizing the extracted failure occurrence ratio indexes over a plurality of concerned workshop-conditioned failure influential items to thereby determine arithmetically the indexes indicating the failure occurrence ratios for the standard manufacturing works, respectively, in said manufacturing workshop, results of said evaluation and estimation being stored as a workshop index in a product/article evaluating database;

a product evaluating step of evaluating a quality indicating a work-related defective ratio of a product manufactured through a plurality of manufacturing works in said manufacturing workshop by using the workshop index concerning said manufacturing workshop as stored in the product/article evaluating database in said workshop evaluation step, further comprising:

a product database preparation step of storing in advance for preparation in a product evaluating database indexes indicating fractions defectives in a plurality of mutually differing standard manufacturing operations, respectively, and supplementary indexes which are based on properties of component parts involved in the standard manufacturing operations, respectively;

a product input step of inputting standard manufacturing operations inclusive of properties of the component parts involved in individual manufacturing works, respectively, over a plurality of manufacturing works for manufacturing a product;

a step of extracting the indexes indicating the fractions defectives and the supplementary indexes from the product evaluating database prepared in said product database preparation step on the basis of the standard manufacturing operations inclusive of the properties of the component parts in the individual manufacturing works as inputted in said product input step, said extracting step being executed in said product evaluating step; and an evaluation/estimation step of correcting supplementarily said indexes indicative of the fractions defectives with said extracted supplementary indexes and said workshop index stored in said workshop evaluation step, and then synthesizing said supplementarily corrected indexes indicating the fractions defectives throughout a plurality of manufacturing works, to thereby evaluate through estimation the work-related defective ratio of the product.

11. A method of evaluating quality of a product, comprising:

a workshop evaluating step of storing, as a workshop index in a product evaluating database, a failure occurrence likelihood for each of standard manufacturing operations in a manufacturing workshop as estimated and evaluated by using a method of evaluating the failure occurrence likelihood in the manufacturing workshop, wherein said method of evaluating the failure occurrence likelihood comprises:

a workshop database preparation step of creating previously a workshop evaluating database to be stored for preparation, said workshop evaluating database indicating correspondence relations between a plurality of workshop-conditioned failure influential items set previously and failure occurrence ratio indexes at least for standard manufacturing works at standard workshop facility levels for said workshop-conditioned failure influential items, respectively, a step of extracting from said workshop evaluating database Prepared in said workshop database preparation step those failure occurrence ratio indexes which correspond to workshop facility levels of an inputted evaluation-undergoing manufacturing workshop for the workshop-conditioned failure influential items, respectively, and a workshop evaluation step of evaluating through estimation the failure occurrence likelihood in said evaluation-undergoing manufacturing workshop by totalizing-the extracted failure occurrence ratio indexes for a plurality of concerned workshop-conditioned failure influential items to thereby determine arithmetically the indexes indicating the failure occurrence ratios for the standard manufacturing works, respectively, in said evaluation-undergoing manufacturing workshop; and a product evaluating step of evaluating/estimating a quality indicating a work-related defective ratio of a product manufactured through a plurality of manufacturing works in said manufacturing workshop by using the workshop index concerning said manufacturing workshop as stored in said product evaluating database in said workshop evaluating step.

12. A method of evaluating quality of a product, comprising:

a workshop evaluating step of storing, as a workshop index in a product evaluating databases, a failure occurrence likelihood for each of standard manufacturing operations in a manufacturing workshop as estimated and evaluated by using a method of evaluating the failure occurrence likelihood in the manufacturing workshop, wherein said method of evaluating the failure occurrence likelihood comprises:

a workshop database preparation step of creating previously a workshop evaluating database to be stored for preparation, said workshop evaluating database indicating correspondence relations between a plurality of workshop-conditioned failure influential items set previously and failure occurrence ratio indexes at least for standard manufacturing works at standard workshop facility levels for said workshop-conditioned failure influential items, respectively, a step of extracting from said workshop evaluating database prepared in said workshop database preparation step those failure occurrence ratio indexes which correspond to workshop facility levels of an inputted evaluation-undergoing manufacturing workshop for the workshop-conditioned failure influential items, respectively, and a workshop evaluation step of evaluating through estimation the failure occurrence likelihood in said evaluation-undergoing manufacturing workshop by totalizing the extracted failure occurrence ratio indexes for a plurality of concerned workshop-conditioned failure influential items to thereby determine arithmetically the indexes indicating the failure occurrence ratios for the standard manufacturing works, respectively, in said evaluation-undergoing manufacturing workshop;

a product database preparation step of storing in advance for preparation in a product evaluating database indexes indicating fractions defectives in a plurality of standard manufacturing operations which are different from each other, respectively, and supplementary indexes which are based on properties of component parts involved in the standard manufacturing operations, respectively;

a product input step of inputting standard manufacturing operations inclusive of properties of the component parts involved in individual manufacturing works, respectively, over a plurality of manufacturing works for manufacturing a product;

a step of extracting the indexes indicating the fractions defectives and the supplementary indexes from the product evaluating database prepared in said product database preparation step on the basis of the standard manufacturing operations inclusive of the properties of the component parts in the individual manufacturing works as inputted in said product input step; and a product evaluating step of correcting supplementarily the extracted indexes indicative of the fractions defectives with said extracted supplementary indexes and synthesizing said supplementarily corrected indexes indicating the fractions defectives throughout a plurality of manufacturing works, whereon the synthesized index indicative of the fraction defective is supplementarily corrected with the workshop index stored in said workshop evaluation step for thereby evaluating through estimation the quality of said product indicative of a work-related defective ratio.

13. A method of evaluating quality of a product, comprising the undermentioned steps:

a workshop evaluating step of storing, as a workshop index in a product evaluating databases, a failure occurrence likelihood for each of standard manufacturing operations in a manufacturing workshop as estimated and evaluated by using the method of evaluating the failure occurrence likelihood in the manufacturing workshop said method evaluating the failure occurrence likelihood comprises:

a workshop database Preparation step of creating previously a workshop evaluating database to be stored for preparation, said workshop evaluating database indicating correspondence relations between a plurality of workshop-conditioned failure influential items set previously and failure occurrence ratio indexes at least for standard manufacturing works at standard workshop facility levels for said workshop-conditioned failure influential items, respectively, a step of extracting from said workshop evaluating database prepared in said workshop database preparation step those failure occurrence ratio indexes which correspond to workshop facility levels of an inputted evaluation-undergoing manufacturing workshop for the workshop-conditioned failure influential items, respectively, and a workshop evaluation step of evaluating through estimation the failure occurrence likelihood in said evaluation-undergoing manufacturing workshop by totalizing the extracted failure occurrence ratio indexes for a plurality of concerned workshop-conditioned failure influential items to thereby determine arithmetically the indexes indicating the failure occurrence ratios for the standard manufacturing works, respectively, in said evaluation-undergoing manufacturing workshop;

a product database preparation step of storing in advance for preparation in a product evaluating database indexes indicating fractions defectives in a plurality of standard manufacturing operations which are different from each other, respectively, and supplementary indexes which are based on properties of component parts involved in the standard manufacturing operations, respectively;

a product input step of inputting standard manufacturing operations inclusive of properties of the component parts involved in individual manufacturing works, respectively, over a plurality of manufacturing works for manufacturing a product;

a step of extracting the indexes indicating the fractions defectives and the supplementary indexes from the product evaluating database prepared in said product database preparation step on the basis of the standard manufacturing operations inclusive of the properties of the component parts in the individual manufacturing works as inputted in said product input step; and a product evaluating step of correcting supplementarily said extracted indexes indicative of the fractions defectives with said extracted supplementary indexes and said workshop index stored in said workshop evaluating step, and synthesizing said supplementarily corrected indexes indicating the fractions defectives throughout a plurality of manufacturing works, to thereby estimate and evaluate the quality indicative of a work-related defective ratio of said product.

14. An apparatus for evaluating a failure occurrence likelihood of a manufacturing workshop, comprising:

storage means for storing previously a workshop evaluating database created in advance, said workshop evaluating database indicating correspondence relations between a plurality of workshop-conditioned failure influential items set previously and failure occurrence ratio indexes at least for standard manufacturing works at standard workshop facility levels for said workshop-conditioned failure influential items, respectively; and workshop evaluating means for extracting from said workshop evaluating database stored in said storage means said failure occurrence ratio indexes which correspond to workshop facility levels of an inputted evaluation-undergoing manufacturing workshop for the workshop-conditioned failure influential items, respectively, and evaluating through estimation the failure occurrence likelihood in said evaluation-undergoing manufacturing workshop by totalizing the extracted failure occurrence ratio indexes for a plurality of concerned workshop-conditioned failure influential items to thereby determine arithmetically the indexes indicating the failure occurrence ratios for the standard manufacturing works, respectively, in said evaluation-undergoing manufacturing workshop.

15. An apparatus for evaluating a failure occurrence likelihood of a manufacturing workshop, comprising:

storage means for storing previously a workshop evaluating database created in advance, said workshop evaluating database indicating correspondence relations between a plurality of workshop-conditioned failure influential items set previously and failure occurrence ratio indexes at least for standard manufacturing works at standard workshop facility levels for said workshop-conditioned failure influential items, respectively;

input means for inputting at least workshop facility levels of an evaluation-undergoing manufacturing workshop for said workshop-conditioned failure influential items, respectively; and workshop evaluating means for extracting from said workshop evaluating database stored in said storage means said failure occurrence ratio indexes which correspond to workshop facility levels inputted by said input means for the workshop-conditioned failure influential items, respectively, and evaluating through estimation the failure occurrence likelihood in said evaluation-undergoing manufacturing workshop by totalizing the extracted failure occurrence ratio indexes for a plurality of concerned workshop-conditioned failure influential items to thereby determine arithmetically the indexes indicating the failure occurrence ratios for the standard manufacturing works, respectively, in said evaluation-undergoing manufacturing workshop.

16. An apparatus for evaluating a failure occurrence likelihood of a manufacturing workshop comprising:

storage means for storing previously a workshop evaluating database created in advance, said workshop evaluating database indicating correspondence relations between workshop-conditioned failure influential items set previously concerning worker(s), manufacturing equipment, manufacturing conditions, physical environment for manufacturing and management on one hand and on the other hand failure occurrences indexes representing failure occurrence suppressing abilities, failure coping time rate indexes representing failure occurrence coping abilities and defective extraction indexes representing failure detecting abilities at least for standard manufacturing works, respectively, at standard workshop facility levels for said workshop-conditioned failure influential items, respectively;

input means for inputting at least workshop facility levels of an evaluation-undergoing manufacturing workshop for said workshop-conditioned failure influential items, respectively; and workshop evaluating means for extracting from said workshop evaluating database stored in said storage means said failure occurrence, failure coping time rate, and defective extraction indexes which correspond to workshop facility levels inputted by said input means for the workshop-conditioned failure influential items, respectively, and evaluating through estimation the failure occurrence likelihood in said evaluation-undergoing manufacturing workshop by totalizing the three extracted indexes for a plurality of concerned workshop-conditioned failure influential items to thereby determine arithmetically indexes indicating failure occurrence ratios for the standard manufacturing works, respectively, in said evaluation-undergoing manufacturing workshop.

17. An apparatus for evaluating a failure occurrence likelihood of a manufacturing workshop as set forth in claim 14, further comprising:

outputting means for outputting results of evaluation/estimation as executed by said workshop evaluating means.

18. An apparatus for evaluating a failure occurrence likelihood of a manufacturing workshop, comprising:

storage means for storing previously a workshop evaluating database created in advance, said workshop evaluating database indicating correspondence relations between a plurality of workshop-conditioned failure influential items set previously and failure occurrence ratio indexes at least for standard manufacturing works at standard workshop facility levels for said workshop-conditioned failure influential items, respectively; and evaluation means including a workshop evaluating unit designed for extracting from said workshop evaluating database stored in said storage means said failure occurrence ratio indexes which correspond to workshop facility levels of an inputted manufacturing workshop for the workshop-conditioned failure influential items thereof, respectively, to thereby evaluate and estimate the failure occurrence likelihood for the standard manufacturing works in said inputted manufacturing workshop by totalizing said extracted failure occurrence ratio indexes over a plurality of concerned workshop-conditioned failure influential items to determine arithmetically the indexes indicating the failure occurrence ratios for the standard manufacturing works, respectively, in said inputted manufacturing workshop, said failure occurrence likelihood being stored as a workshop index in a product evaluating database stored in said storage means, and a product evaluating unit designed for evaluating and estimating a quality indicating a work-related defective ratio of a product manufactured through a plurality of manufacturing works in said inputted manufacturing workshop by using workshop indexes of said manufacturing workshop which are stored in said product evaluating database by said workshop evaluating unit.

19. An apparatus for evaluating a failure occurrence likelihood of a manufacturing workshop, comprising:

storage means for storing previously workshop evaluating database and a product evaluating database created in advance, said workshop evaluating database indicating correspondence relations between a plurality of workshop-conditioned failure influential items set previously and failure occurrence ratio indexes at least for standard manufacturing works at standard workshop facility levels for said workshop-conditioned failure influential items, respectively, while said product evaluating database stores therein indexes indicating defective ratios in a plurality of mutually different standard manufacturing operations, respectively, and supplementary correcting indexes based on properties of component parts involved in individual standard manufacturing operations;

a workshop evaluating unit designed for extracting from said workshop evaluating database stored in said storage means said failure occurrence ratio indexes which correspond to workshop facility levels of an inputted manufacturing workshop for the workshop-conditioned failure influential items thereof, respectively, to thereby evaluate and estimate a failure occurrence likelihood for standard manufacturing operations in said inputted manufacturing workshop by totalizing said extracted failure occurrence ratio indexes for a plurality of concerned workshop-conditioned failure influential items to determine arithmetically the indexes indicating the failure occurrence ratios for the standard manufacturing works, respectively, in said inputted manufacturing workshop, said failure occurrence likelihood being stored as a workshop index in said product evaluating database stored in said storage means; and means for extracting the indexes indicating the defective ratios and the supplementary correcting indexes from the product evaluating database stored in said storage means on the basis of a plurality of standard manufacturing operations for manufacturing an inputted product, inclusive of properties of component parts involved in said standard manufacturing operations, respectively; and evaluating means including a product evaluating unit designed for correcting extracted indexes indicating the defective ratios with said extracted supplementary correcting indexes and synthesizing said corrected indexes indicating the defective ratios over a plurality of manufacturing operations and correcting said synthesized index indicating the synthesized defective ratio with said workshop index stored in said storage means by said workshop evaluating unit to thereby evaluate and estimate a quality indicative of work-related defective ratio of the product.

20. An apparatus for evaluating a failure occurrence likelihood of a manufacturing workshop, comprising:

storage means for storing previously a workshop evaluating database and a product evaluating database created in advance, said workshop evaluating database indicating correspondence relations between a plurality of workshop-conditioned failure influential items set previously and failure occurrence ratio indexes at least for standard manufacturing works at standard workshop facility levels for said workshop-conditioned failure influential items, respectively, while said product evaluating database stores therein indexes indicating defective ratios in a plurality of mutually different standard manufacturing operations, respectively, and supplementary correcting indexes based on properties of component parts involved in individual standard manufacturing operations;

a workshop evaluating unit designed for extracting from said workshop evaluating database stored in said storage means said failure occurrence ratio indexes which correspond to workshop facility levels of an inputted manufacturing workshop for the workshop-conditioned failure influential items thereof, respectively, to thereby evaluate and estimate a failure occurrence likelihood for the standard manufacturing operations in said inputted manufacturing workshop by synthesizing said extracted failure occurrence ratio indexes for a plurality of concerned workshop-conditioned failure influential items to determine arithmetically the indexes indicating the failure occurrence ratios for the standard manufacturing works, respectively, in said inputted manufacturing workshop, said failure occurrence likelihood being stored as a workshop index in said produce evaluating database stored in said storage means; and means for extracting the indexes indicating the defective ratios and the supplementary correcting indexes from the product evaluating database stored in said storage means on the basis of a plurality of standard manufacturing operations for manufacturing an inputted product, inclusive of properties of component parts involved in said manufacturing operations, respectively; and evaluating means including a product evaluating unit designed for correcting said extracted indexes indicating the defective ratios with said extracted supplementary correcting indexes and said workshop index stored in said storage means by said workshop evaluating unit and synthesizing said corrected indexes indicating the defective ratios over a plurality of manufacturing operations to thereby evaluate and estimate a quality indicative of a work-related defective ratio of the product.

21. A recording medium recording a program for executing the method of evaluating quality of a product, comprising:

a workshop database preparation step of creating previously a workshop evaluating database to be stored for preparation, said workshop evaluating database indicating correspondence relations between a plurality of workshop-conditioned failure influential items set previously and failure occurrence ratio indexes at least for standard manufacturing works at standard workshop facility levels for said workshop-conditioned failure influential items, respectively;

a step of extracting from said workshop evaluating database prepared in said workshop database preparation step those failure occurrence ratio indexes which correspond to workshop facility levels of an inputted manufacturing workshop for the workshop-conditioned failure influential items, respectively;

a workshop evaluation step of evaluating and estimating failure occurrence likelihood in the manufacturing workshop by totalizing the extracted failure occurrence ratio indexes over a plurality of concerned workshop-conditioned failure influential items to thereby determine arithmetically the indexes indicating the failure occurrence ratios for the standard manufacturing works, respectively, in said manufacturing workshop, results of said evaluation and estimation being stored as a workshop index in a product/article evaluating database; and a product evaluating step of evaluating a quality indicating a work-related defective ratio of a product manufactured through a plurality of manufacturing works in said manufacturing workshop by using the workshop index concerning said manufacturing workshop as stored in the product/article evaluating database in said workshop evaluation step.

\* \* \* \* \*